United States Patent
Rodriguez et al.

(10) Patent No.: US 7,657,916 B2
(45) Date of Patent: Feb. 2, 2010

(54) DIGITAL SUBSCRIBER TELEVISION NETWORKS WITH LOCAL PHYSICAL STORAGE DEVICES AND VIRTUAL STORAGE

(75) Inventors: Arturo A. Rodriguez, Norcross, GA (US); Dean F. Jerding, Roswell, GA (US)

(73) Assignee: Cisco Technology, Inc., San Jose, CA (US)

(*) Notice: Subject to any disclaimer, the term of this patent is extended or adjusted under 35 U.S.C. 154(b) by 1276 days.

(21) Appl. No.: 09/918,376

(22) Filed: Jul. 30, 2001

(65) Prior Publication Data
US 2002/0059623 A1     May 16, 2002

Related U.S. Application Data

(60) Provisional application No. 60/222,482, filed on Jul. 31, 2000.

(51) Int. Cl.
*H04N 7/173* (2006.01)
*G06F 13/00* (2006.01)

(52) U.S. Cl. .......................... 725/115; 725/134; 725/54

(58) Field of Classification Search .................. 725/115, 725/134, 54
See application file for complete search history.

(56) References Cited

U.S. PATENT DOCUMENTS

| | | | |
|---|---|---|---|
| 5,530,754 A | 6/1996 | Garfinkle | |
| 5,625,406 A * | 4/1997 | Newberry et al. | 725/54 |
| 5,721,815 A | 2/1998 | Ottesen et al. | |
| 5,790,935 A * | 8/1998 | Payton | 725/91 |
| 5,815,194 A | 9/1998 | Ueda | |
| 5,983,316 A * | 11/1999 | Norwood | 711/112 |
| 6,002,394 A * | 12/1999 | Schein et al. | 725/39 |
| 6,137,549 A * | 10/2000 | Rasson et al. | 725/37 |
| 6,285,632 B1 * | 9/2001 | Ueki | 379/32.01 |
| 6,507,950 B1 * | 1/2003 | Tsukidate et al. | 725/54 |
| 6,598,231 B1 * | 7/2003 | Basawapatna et al. | 725/120 |
| 6,757,911 B1 * | 6/2004 | Shimoji et al. | 725/136 |
| 6,928,653 B1 * | 8/2005 | Ellis et al. | 725/50 |
| 6,973,669 B2 * | 12/2005 | Daniels | 725/112 |
| 7,028,327 B1 * | 4/2006 | Dougherty et al. | 725/93 |
| 2009/0150948 A1 | 6/2009 | Rodriguez et al. | |

OTHER PUBLICATIONS

U.S. Non-Final Office Action cited in U.S. Appl. No. 12/388,731 mailed Nov. 4, 2009.

* cited by examiner

*Primary Examiner*—James Sheleheda
(74) *Attorney, Agent, or Firm*—Merchant & Gould P.C.

(57) ABSTRACT

A dual mode file system in a subscriber network television system, comprising a memory with logic, and a processor configured with the logic to use remote data to support the processor until the logic detects that local data is available.

54 Claims, 10 Drawing Sheets

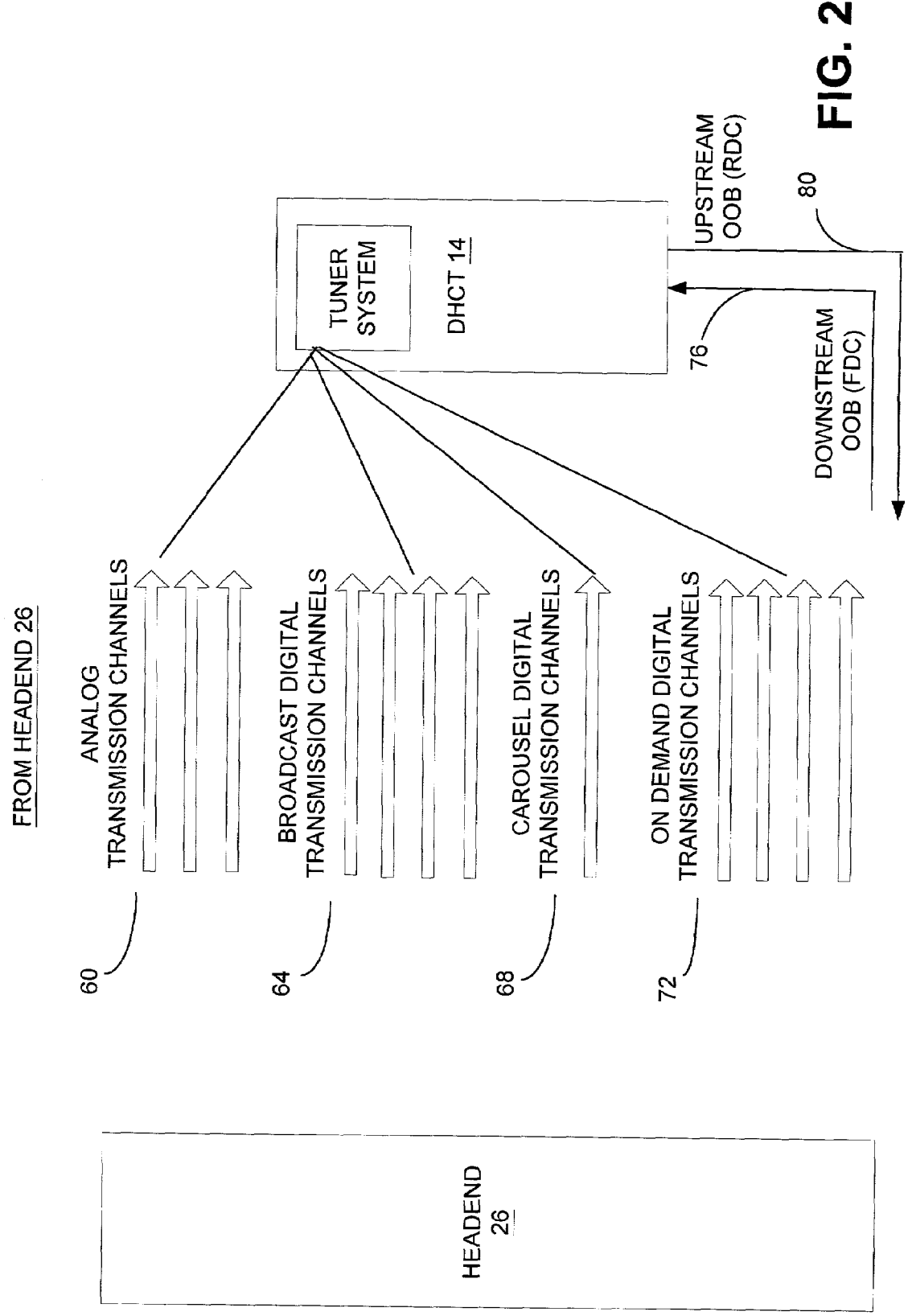

time view

| TWC 01 | | | CURRENT TV PROGRAM | | | |
|---|---|---|---|---|---|---|
| Local and National Weather 2:00 PM - 3:00 PM | | | | | | |
| channel | | | 10 | Tue 9/1 | 12:01 PM | |
| | | ▼ | 2:00 pm | ▲ 2:30 pm | 3:00 pm | |
| etw | 301 | | Extra | Entertainment News | American History X | |
| ppv | 400 | | ◀ Saving Private Ryan | | | |
| ◀ twc ▶ | 1 | | Local and National Weather | | Local Forecast | |
| etv | 2 | | Talk Soup | | E! Behind the Scenes | |
| tvld | 3 | | One Life to Live | | General Hospital | | tue 9/1    ⓐ browse by    ⓑ Date    ⓒ ↩

FIG. 5

70 time view

| TWC 01 | CURRENT |
| --- | --- |
| Local and National Weather 2:00 PM - 3:00 PM | TV PROGRAM |

| channel | 2:00 pm | 2:30 pm | 3:00 pm | 10 Tue 9/1 12:01 PM | etv — YOUR SET-TOP BOX HAS THE CAPABILITY TO PROVIDE ADDITIONAL DAYS OF PROGRAMMING INFORMATION. ARE YOU INTERESTED IN HAVING THIS EXTENDED SERVICE?

△ YES  Ⓑ NO  Ⓒ MORE INFO

History X
ecast
General Hospital
the Scenes

3  One Life to Live tue 9/1   Ⓐ browse by  Ⓑ Date

DIGITAL SUBSCRIBER TELEVISION NETWORKS WITH LOCAL PHYSICAL STORAGE DEVICES AND VIRTUAL STORAGE

CROSS-REFERENCE TO RELATED APPLICATION

This application claims priority to copending U.S. provisional application entitled, "Apparatuses and Methods to Enable Set-Top Boxes of Digital Cable TV Networks with Simultaneous Usage of Local Physical storage Devices and Virtual Storage," having Ser. No. 60/222,482, filed Jul. 31, 2000, which is entirely incorporated herein by reference.

TECHNICAL FIELD

This invention relates in general to the field of television systems, and more particularly, to the field of interactive television.

BACKGROUND OF THE INVENTION

Historically, subscriber network television services have been comprised primarily of analog broadcast audio and video signals. Subscriber network television systems now receive broadcasts and retransmit them with other programming to users. With the recent advent of digital transmission technology, subscriber network television systems are now capable of providing much more than the traditional analog broadcast video. In addition, two-way and advanced one-way communications between a subscriber, or user, and a subscriber network television system headend are now possible.

In implementing enhancements to TV viewing, the home communication terminal ("HCT"), otherwise known as the set-top box, has become an important computing device for accessing and receiving video services and navigating a subscriber through a maze of services available. In addition to supporting traditional analog broadcast video functionality, digital HCTs (or "DHCTs") now also support an increasing number of services which include digital two-way communication such as video-on-demand, Internet e-mail, and browsing, among others. These are all in addition to the host of other television services which are increasingly being demanded by consumers, examples of which include audio and audio/visual programming, advanced navigation controls, impulse pay-per-view technology, and on-line commerce. In addition to the interactive services, the increased bandwidth available through a subscriber network television system has made it possible for a subscriber to have access to hundreds, or even thousands, of channels and/or services. Most of these services presented to the television viewer are media intensive and demand high bandwidth.

Therefore, what is needed is a flexible mechanism that enables the efficient use of various types of DHCTs to more fully use the many and varied services available via the subscriber networks.

SUMMARY OF THE INVENTION

The preferred embodiment of the present invention can be viewed as, among other things, a dual mode file system in a subscriber network television system. The dual mode file system can generally be described as including a memory with logic, and a processor configured with the logic to use remote data to support the processor until the logic detects that local data is available.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 shows a block diagram of the input channels supported by a DBDS, and input into the DHCT from the headend, according to one embodiment of the invention.

FIG. 5 is a screen diagram of an example electronic programming guide (EPG) screen formatted in a time view, in accordance with one embodiment of the invention.

FIG. 6 is a screen diagram of the example EPG screen of FIG. 5 with an example barker alerting the user that he or she has a DHCT with enhanced features, in accordance with one embodiment of the invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Like numbers refer to like elements throughout. Furthermore, all "examples" given herein are intended to be non-limiting and among others.

Figure 1:
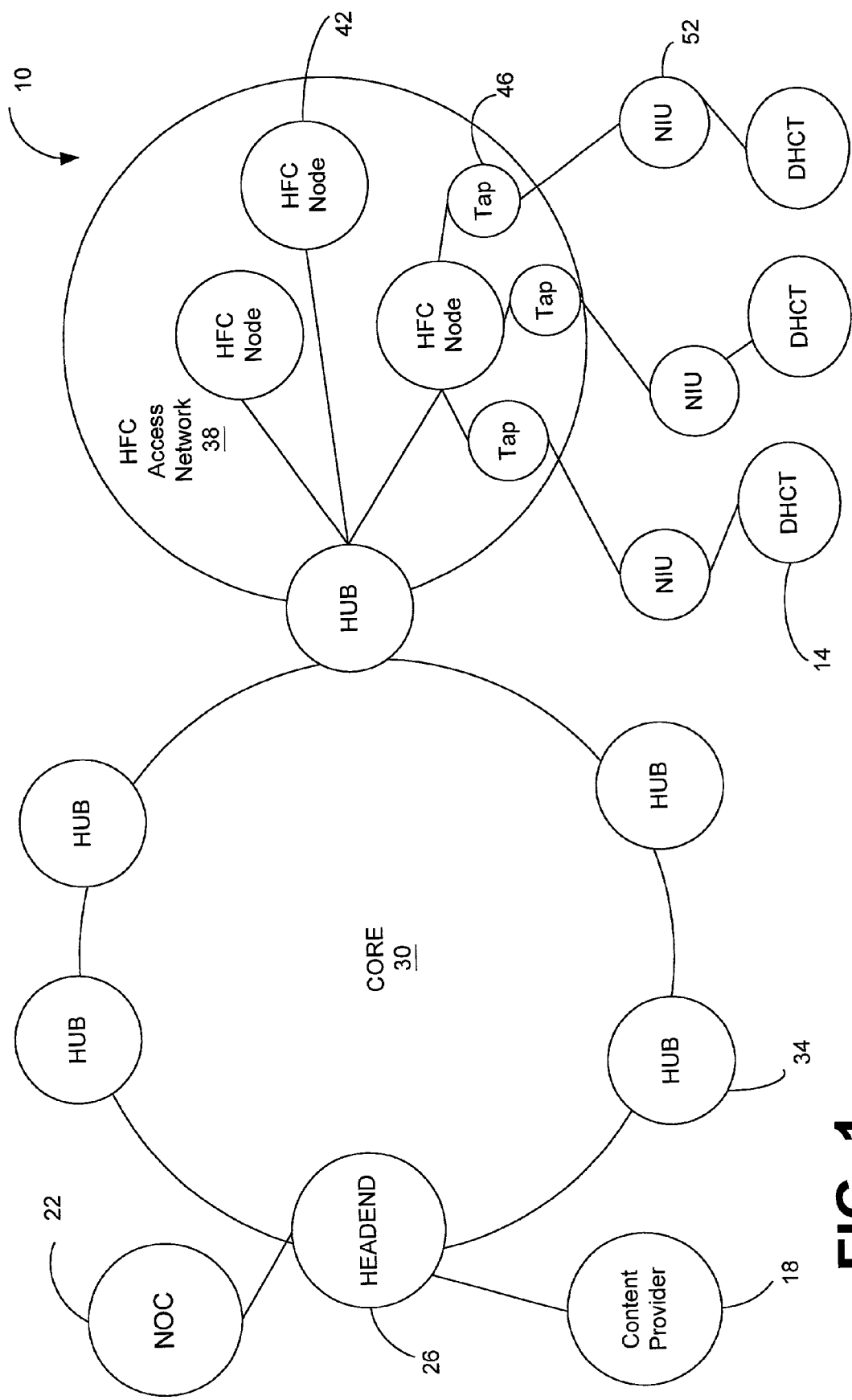
FIG. 1 shows a block diagram of an example Digital Broadband Delivery System (DBDS) including an example Digital Home Communication Terminal (DHCT) and an example headend, according to one embodiment of the invention.

One embodiment of the invention is generally implemented as part of a subscriber network television (TV) system such as a digital broadband delivery system (DBDS) or cable television system (CTS). For example, a DBDS 10 and its operation will be described initially, with the understanding that other conventional data delivery systems are within the scope of the preferred embodiments of the invention. FIG. 1 shows a block diagram view of a DBDS, in accordance with one embodiment of the invention. Generally, the DBDS 10 is a high-quality, reliable and integrated network system that features video, audio, voice and data services to subscriber network TV subscribers. Although FIG. 1 depicts a high level view of a DBDS 10 including a regional HFC Access Network 38, as will be described below, it should be appreciated that a plurality of DBDSs can tie together a plurality of regional networks into an integrated global network so that subscriber network TV subscribers can receive content provided from anywhere in the world. The DBDS 10 shown in FIG. 1 delivers broadcast video signals as digitally formatted signals in addition to delivering traditional broadcast analog video signals. Furthermore, the system can support one way broadcast services as well as both one-way data services and two-way media content and data services. The two-way operation of the network allows for subscriber interactivity with services, such as Pay-Per-View programming, View-on-Demand programs, and interactive applications, such as Email, Internet connections, and electronic program guide (EPG) applications.

The DBDS 10 provides the interfaces, network control, transport control, session control, and servers to access content and services, and distributes content and services to subscriber network TV subscribers. As shown in FIG. 1, a typical DBDS 10 is composed of interfaces to Content Providers 18, Network Operations Centers (NOC) 22, core networks 30 of headends 26, hubs 34, Hybrid Fiber/Coax (HFC) Access Networks 38, and subscriber DHCTs 14. It should be appreciated that although single components (e.g., headend 26, core network 30, HFC Access network 38, etc.) are illustrated in FIG. 1, a DBDS 10 can feature a plurality of each of the illustrated components.

The Content Provider 18 represents one or more providers of content, such as video channels, music channels, data channels, video services, audio services and data services. For example, according to one aspect of the invention, the Content Provider 18 could comprise an Electronic Program Guide (EPG) data provider (not shown) that acts as a data service provider. The EPG data provider can be physically located anywhere, locally in the headend 26 or at another distant location in the DBDS 10, or even externally on the Internet. The interconnection of regional networks with higher networks allows the flow of EPG data across many paths to/from many sources. EPG data is loaded into the DBDS 10 by the EPG Server, described below, for delivery to the subscriber. The DBDS 10 knows where to connect to receive and store in EPG servers the most current EPG data on a periodic schedule and how to check for updates and changes. Accordingly, the DBDS 10 allocates sufficient resources to receive EPG data from one or more EPG data providers, coalesce multiple EPG data sets into one, organize and possibly compress it into a pre-specified format suitable for reception and interpretation by the EPG application running on DHCTs 14 (described below) that then stores part of the EPG data in the DHCT memory and all or another part in a local storage device connected to the DHCT, as will be described below. In addition to transmitting the EPG data over one or more in-band digital downstream channels and downstream OOB channels, the EPG data can be transmitted in assigned analog channels, as will be described below. Albeit a limited amount of data and a slower data rate, the EPG data can be encoded in the Vertical Blanking Interval (VBI) of the analog video signal transmitted via an analog RF Channel to provide additional versatility. VBI encompass the first 25 lines of an analog television signal. Thus the VBI signals are used to carry EPG data as well as other low speed data.

According to another aspect of the invention, the Content Provider 18 could represent an Internet Service Provider (ISP) providing data to the system to enable subscribers web access or web-enhanced video via the subscriber television set. Web access herein implies access to media content such as audio or video streams, graphical or natural images, and text that constitute an internet presentation displayed by itself on the subscriber's TV or displayed in addition to the currently viewed broadcast TV channel to complement the display with useful information and provide an enhanced TV viewing experience. Web accessed data can be anticipated and conveniently cached in the DHCT 14 for low latency retrieval by storing it in the local physical storage device (not shown) connected to, or contained within the DHCT 14 ahead of time, as will be described below.

The Content Provider 18 transmits the content to a headend 26 for further transmission to subscribers downstream in the DBDS 10. Also in communication with the headend 26 is a Network Operation Center (NOC) 22, which is an external management center interfaced with the DBDS 10 to allow for the remote operation of the system.

Content provided by the Content Provider 18 is communicated by the Content Provider 18 to one or more headends 26. From those headends 26 the content is then communicated to the core network 30 of hubs 34 and onto a plurality of Hybrid/Fiber Coax (HFC) Access Networks (only one HFC Access Network 38 is illustrated). The HFC Access Network 38 typically comprises a plurality of HFC nodes 42, each which may service a local geographical area. The content provided from the Content Provider 18 is transmitted through the headend 26, hub 34 and HFC Access Network 38 downstream to one or more taps 46 from each one of the HFC nodes 42 of the HFC Access Network 38. The hub 34 connects to the HFC node 42 through the fiber portion of the HFC Access Network 38. Usually, the HFC node 42 connects to a subscriber DHCT 14 through coaxial cable in a logical tree configuration, which is where the optical-to-electrical and electrical-to-optical conversions of the HFC network take place. From the HFC node 42 a coaxial drop connects the tap 46, in one implementation, to a Network Interface Unit (NIU) 52, which is a network demarcation point physically located on the side of the home of the subscriber. The NIU 52 provides a transparent interface between the HFC node 42 and the subscribers' internal wiring. In other implementations, the tap 46 connects directly to the DHCT 14. Coaxial cables are preferred in this part of the system because the electrical signals can be easily repeated with RF amplifiers. Typically, six amplifiers or less are located in series between the HFC node 42 and the subscriber DHCTs 14. As DBDSs are well known to those of ordinary skill in the art, further description of the DBDS 10 of FIG. 1 will not be contained herein.

FIG. 2 is a block diagram illustrating the channels supported by the DBDS 10, where the channels 60, 64, 68, 72 and 76 are input into a DHCT 14 in accordance with one embodiment of the invention. These input channels are mostly provided by the one or more Content Providers 18 illustrated in FIG. 1. A few channels can be generated at a headend 26 or at a Hub 34 that might function as a mini-headend and which therefore possesses some of the headend functionality.

As depicted in FIG. 2, the DBDS 10 can simultaneously support a number of transport channel types and modulation formats. The ability to carry analog and digital signals over a large bandwidth are characteristics of a Hybrid Fiber/Coax (HFC) Network typically employed in a DBDS, as in the DBDS 10 of FIG. 1. As will be appreciated by those of ordinary skill in the art, analog and digital signals in HFC networks can be multiplexed using Frequency Division Multiplexing (FDM), which enables many different types of signals to be transmitted over the DBDS 10 to the DHCT 14. Typically, a DBDS 10 using HFC. supports downstream (i.e., in the direction from the headend 26 to the DHCT 14) frequencies from 50 MHz to 870 MHz, whereas upstream frequencies (i.e., in the direction from the DHCT 14 to higher levels of the system) are in the 5 MHz to 42 MHz band. Generally, the RF channel bandwidth spacing for analog and digital services is 6 MHz. Furthermore, for a typical 870 MHz system in the U.S., a possible downstream RF spectrum subdivision plan uses 6 MHz spaced RF channels within the 50 MHz to 550 MHz band for analog video carriers and within the 550 MHz to 870 MHz range for digital carriers. Referring again to FIG. 2, the downstream direction channels, having been multiplexed, in one embodiment, using frequency division multiplexing (FDM), and often referred to as in-band channels, include Analog Transmission Channels (ATCs) 60 and Digital Transmission Channels (DTC) 64, 68, 72 (also known as Digital Transport Channels). These channels carry video, audio and data services. For example, these channels may carry television signals, Internet data, or any additional types of data, such as Electronic Program Guide (EPG) data. The ATCs 60 shown in FIG. 2 are typically broadcast in 6 MHz channels having an analog broadcast composed of analog video and analog audio, and include Broadcast TV Systems Committee (BTSC) stereo and Secondary Audio Program (SAP) audio. Additionally, as will be appreciated by those of ordinary skill in the art, additional data can be sent with the analog video image in the Vertical Blanking Interval (VBI) of the video signal and stored in a DHCT local physical storage device (not shown). It should be appreciated, however, that the amount of data that can be transmitted in the VBI of the analog video signal is typically significantly less than data transmitted in a DTC.

Like the ATCs 60, the DTCs 64, 68, 72 each occupy 6 MHz of the RF spectrum. However, the DTCs 64, 68, 72 are digital channels consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTC channel types over each 6 MHz RF spacing, as compared to a 6 MHz ATC. The three types of digital transport channels illustrated in FIG. 2 include broadcast digital transmission channels 64, carousel digital transmission channels 68, and on-demand transmission channels 72.

MPEG-2 transport may be used to multiplex video, audio, and data in each of these Digital Transmission Channels (DTCs). However, because an MPEG-2 transport stream allows for multiplex video, audio, and data into the same stream, the DTCs do not necessarily have to be allocated in separate 6 MHz RF frequencies, unlike ATCs 60. On the other hand, each DTC is capable of carrying multiple broadcast digital video programs, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. According to one aspect of the invention, encryption can be applied to the data stream for security so that the data may be received only by authorized DHCTs. Authorization can be based on capability to store the data locally, such as DHCTs that have additional DRAM memory, or a local physical storage device either internally or externally connected via a storage device interface (such as SCSI or IDE) or communication port such as USB or IEEE-1394. As will be described below, in one implementation for receiving enhanced services such as extended EPG data, conditional access components in the headend 26 can receive a communication from the DHCT 14 that the user has requested extended EPG and the user has a storage device (and/or additional DRAM memory) and/or the user is authorized to receive extended data. As a result, the headend 26 causes the EPG extended data to be selectively sent to the authorized DHCT 14. The authorized DHCT 14 is provided with the mechanisms to receive additional data or enhanced services. Such mechanisms can include "keys" that are required to decrypt encrypted data. Hence, in one implementation, two mechanisms can ensure that only those subscribers, or users, receive additional EPG data: authorization, and the capability to encrypt.

Thus, only particular DHCTs may be authorized to receive media content or data beneficial to enhance the TV viewing experience. For instance, a DHCT with a local physical storage device can be authorized to receive additional days of EPG program data over the number of days of what a DHCT without a local physical storage device can retain in the DHCT memory. A DHCT with a local physical storage device can also be authorized to download additional incremental amounts of data for all respective applications executing in the DHCT such as additional data for the PPV and VOD applications. Each 6 MHz RF spacing assigned as a digital transmission channel can carry the video and audio streams of the programs of multiple television (TV) stations, as well as media content and data that is not necessarily related to those TV programs or TV channels, as compared to one TV channel broadcast over one ATC 60 that consumes the entire 6 MHz. The digital data is inserted into MPEG transport streams carried through each 6 MHz channel assigned for digital transmission, and then de-multiplexed at the subscriber DHCT so that multiple sets of data can be produced within each tuned 6 MHz frequency span.

Continuing with FIG. 2, the broadcast DTCs 64 and carousel DTCs 68 typically function as continuous feeds for indefinite time, whereas the on-demand DTCs 72 are continuous feeds sessions for a limited time. All DTC types are capable of being transmitted at high data rates. The broadcast DTCs 64 carry typical data comprising multiple digitally-MPEG-2 compressed and formatted TV channels and other continuously fed data information. The carousel DTCs 68 carry broadcast media content or data that is systematically broadcast in a cycling fashion but updated and revised as need be. Thus, the carousel DTCs 68 serve to carry high volume data such as media content and data and possibly, other data at high data rates. The carousel DTCs 68 carry data formatted in directories and files by a Broadcast File System (BFS), which is used for producing and transmitting data streams throughout the DBDS 10, and which provides an efficient means for the delivery of application executables and application media content and data to the DHCT, as will be described below. Media content and data received by the DHCT 14 in such manner can then be saved in the DHCT memory and/or transferred to the DHCT storage device for later use. The on-demand DTCs 72, on the other hand, can carry particular information such as compressed video and audio pertaining to subscriber requested program preview and/or program descriptions, as well as other specialized data information. Although broadcast in nature, the carousel DTCs 68 and on-demand DTCs 72 offer different functionality. The User-to-Network Download Protocol of the MPEG-2 standard's DSM-CC specification (Digital Storage Media—Command and Control) provides the data carousel protocol used for broadcasting data from a server located at headend 26. It also provides the interactive download protocol for reliable downloading of data from a server (possibly the same server) to an individual DHCT through the on-demand DTCs. Each carousel and on-demand DTC is defined by a DSM-CC session.

Also shown in FIG. 2 is an Out-Of-Band (OOB) channel that provides a continuously available two-way signaling path to the subscribers' DHCT 14 regardless of which in-band channels are tuned to by the individual DHCT in-band tuners, as described below. The OOB channel consists of a Forward Data Channel (FDC) 76 and a Reverse Data Channel (RDC) 80. The OOB channel can comply to any one of a number of well known transport protocols but preferably complies to either a DAVIC 1.1 Transport Protocol with FDC of 1.544 Mbps or more using quadrature phase shift keying (QPSK) modulation and an RDC of 1.544 Mbps or more using QPSK modulation, or to a DOCSIS Transport Protocol with FDC of 27 Mbps using 64-QAM modulation and a RDC of 1.544 Mbps or more using QPSK modulation or 16-QAM modulation. The OOB channels provide the two-way operation of the network, which allows for subscriber interactivity with the applications and services provided by the network. Therefore, some of the basic functionality reflected in the DHCT 14 when the DHCT does not have a local physical storage device is somewhat similar to a networked computer (i.e., a computer without a persistent storage device), in addition to traditional set top box functionality, as is well known to those of ordinary skill in the art. A DHCT 14 with a storage device reduces data access latency when the data is stored in the local physical storage device ahead of time. Furthermore, the OOB channels are not limited to a 6 MHz spectrum, but generally to a smaller spectrum, such as 1.5 or 3 MHz.

Figure 3A:
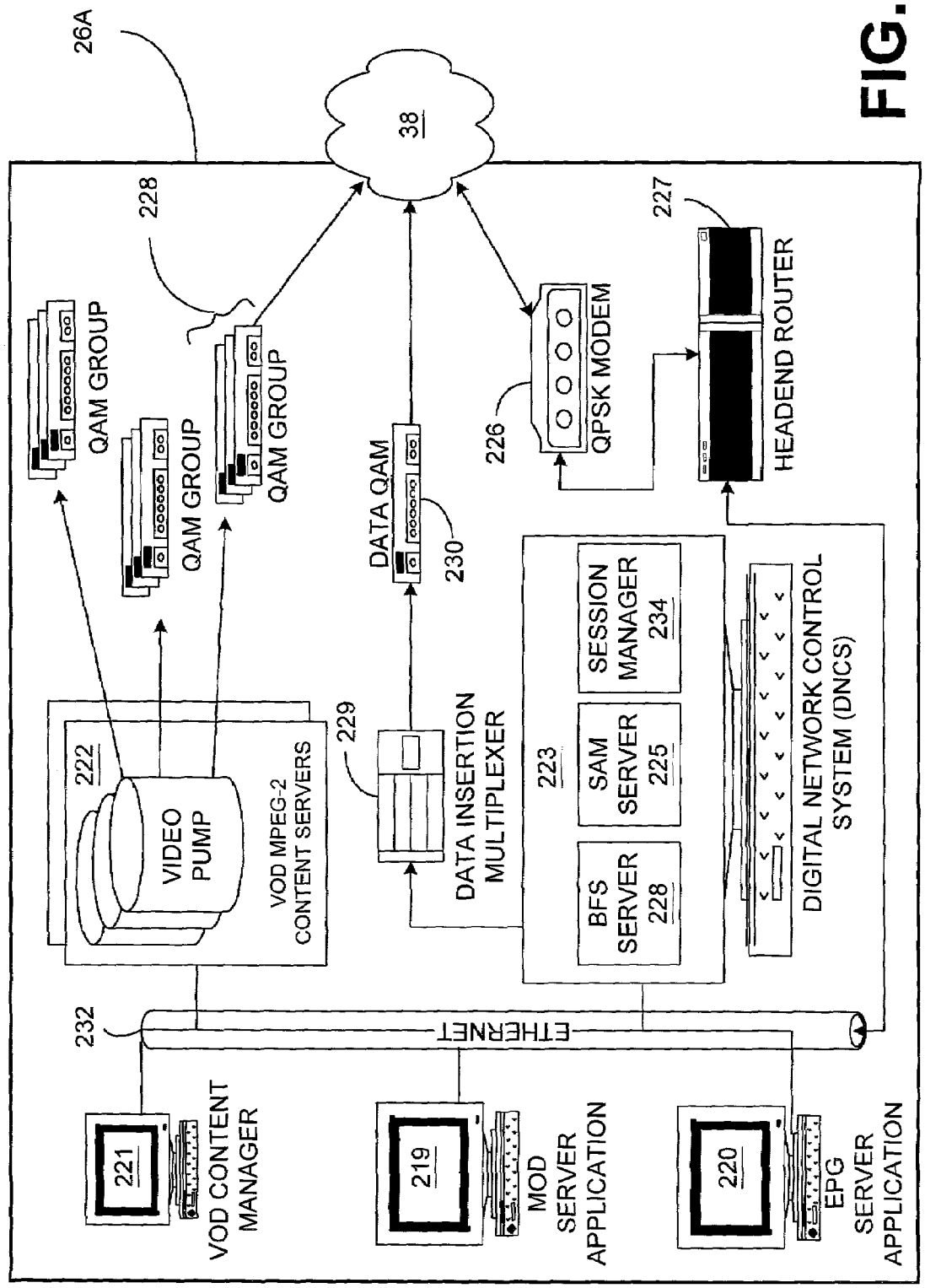
FIGS. 3A-3B are block diagram illustrations of the example headend illustrated in FIG. 1, where FIG. 3A describes portions of the headend for providing EPG and MOD services, and FIG. 3B describes portions of the headend for providing broadcast services, in accordance with one embodiment of the invention.
Figure 3B:
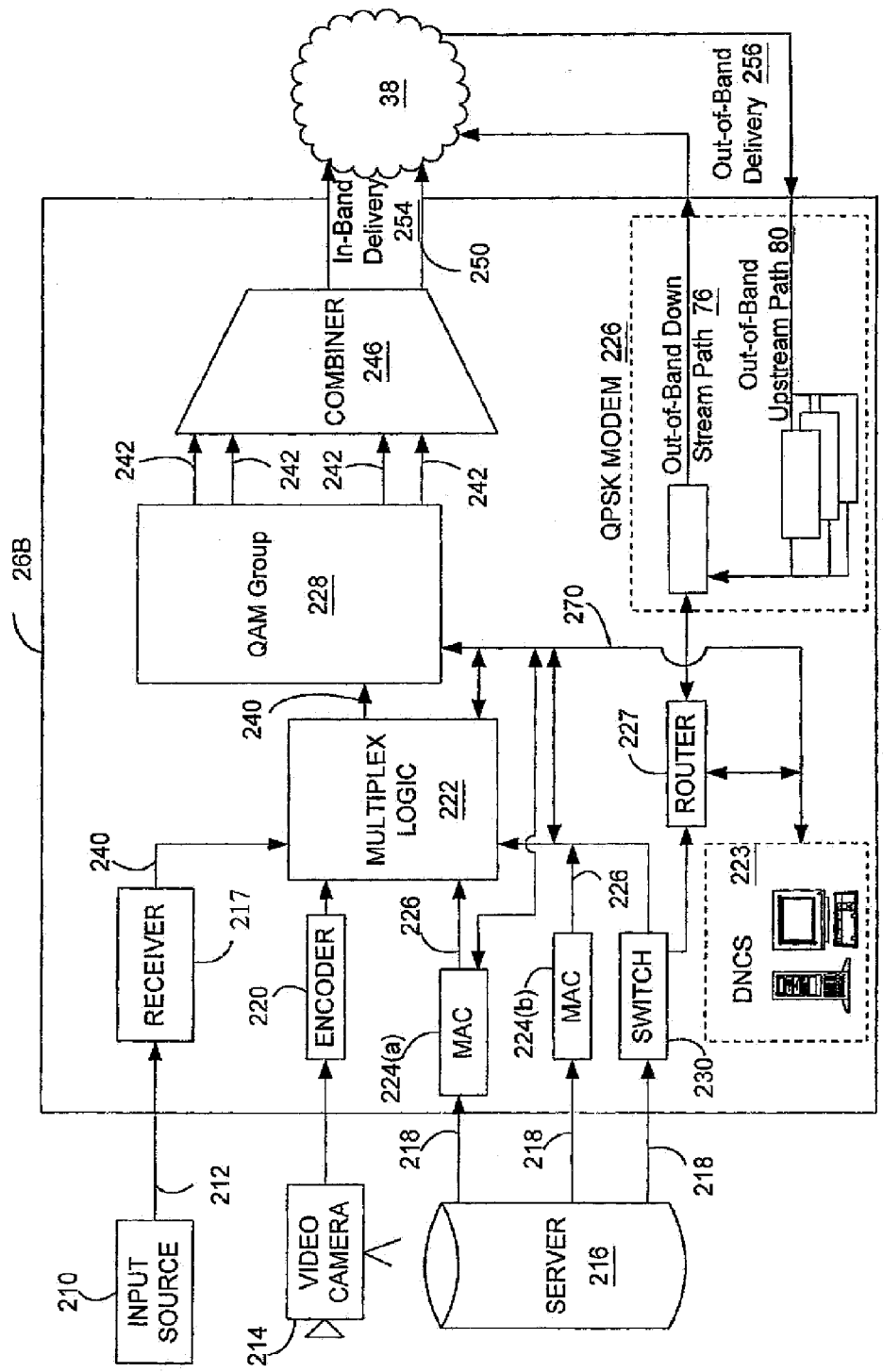

FIGS. 3A and 3B are block diagrams of portions of an example headend. Some of the components illustrated may be located in other locations of the network, such as, for example, one of the hubs. FIG. 3A is a block diagram of portions of an example headend 26A that is configured to provide, among other services, broadcast and media-on-demand (MOD) services and EPG services, in accordance with one embodiment of the invention. MOD services include, among other things, video-on-demand (VOD) services and respective MOD information suitable to be presented to a user via display of an interactive media content guide. MOD server application 219 and EPG server application 220 are connected to a digital network control system (DNCS) 223 via a high-speed network such as an Ethernet connection 232. EPG server application 220 provides EPG data to the EPG application clients (397, FIG. 4) of a plurality of DHCTs 14 throughout the network 38, or transfers the EPG data to the BFS server 228 for distribution to DHCTs 14 which demand the EPG data. The MOD server application 219 is responsible for reserving and configuring system resources needed to provide MOD services and for providing configuration and service data to a MOD client application 363 (FIG. 4), including MOD information comprising a catalog of titles of each media content instance available for on-demand viewing and/ or on-demand rental by a user.

Figure 4:
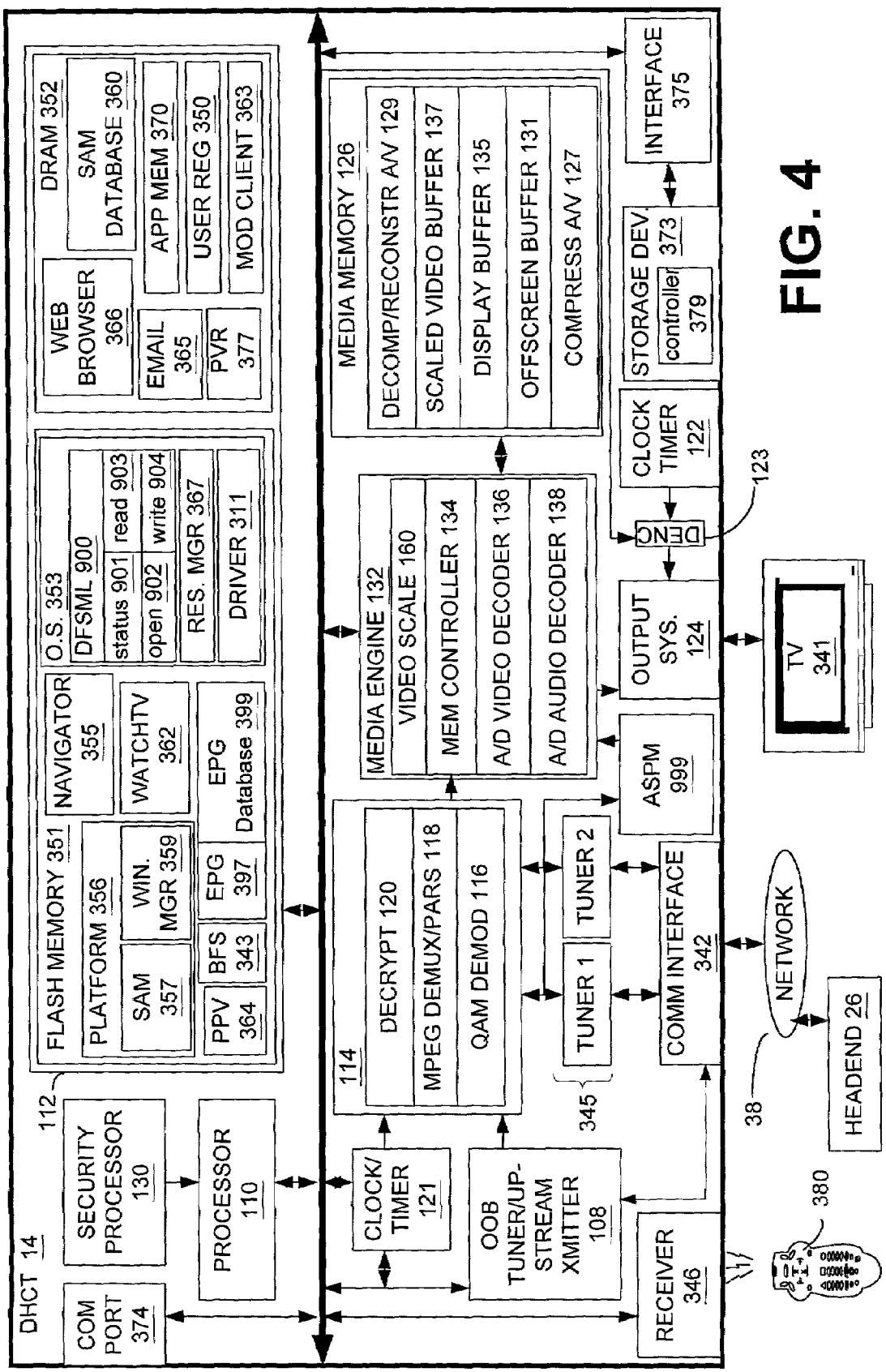
FIG. 4 is a block diagram of the example DHCT of FIG. 1, according to one embodiment of the invention.

The DNCS 223 provides complete management, monitoring, and control of network 38 (FIG. 1) elements and broadcast services provided to users. In one implementation, the DNCS 223 uses a data insertion multiplexer 229 and a data QAM 230 to insert in-band broadcast file system (BFS) data into an MPEG-2 transport stream that is broadcast and received via a DHCT communication interface 342 and tuner system 345 (FIG. 4). The DNCS 223 also contains a session manager 234 that preferably uses Digital Storage Media Command and Control (DSMCC) protocol to set up and maintain MOD sessions. The session manager 234 processes user to network (U-N) session signaling messages, manages allocation of session-related network resources, supports network management operations, acts as a point of contact to the network for the DHCTs 14 in the network 38 to establish individual sessions, and supports MOD services by providing the signaling interface to establish, maintain and release client initiated exclusive sessions.

A service application manager (SAM) server 225 is a server component of a client-server pair of components, with the client component being located at the DHCT 14. Together, the client-server SAM components provide a system in which the user can access services, which are identified by an application to run and one or more parameters, such as particular data content, specific to that service. The SAM server 225 also manages the life cycle of the applications on the system, including the definition, activation, and suspension of services they provide and the downloading of the applications into the DHCT 14 as necessary.

Applications on both the headend 11 and the DHCT 14 can access the data stored in a broadcast file system (BFS) server 228 in a similar manner to a file system found on disk operating systems. The BFS server 228 is a part of a broadcast file system that has a counterpart BFS client module 343 (FIG. 4) in a DHCT 14 connected to the network 38. The BFS server 228 loads data for applications on a data carousel (not shown) that sends data in a cyclical repeated fashion, each cycle approximately the same period of time so that the DHCT 14 that communicates a request for any particular data may receive it when the user desires the data. Thus, the BFS client 343 (FIG. 4) contained in the DHCT 14 that receives the broadcast from the BFS server 228 can implement the application for the user. Thus, the BFS server 228 serves as a virtual file system for a plurality of DHCTs 14.

A VOD content manager 221 is responsible for managing the content on the VOD content servers 222. The MOD server application 219 controls both the VOD content manager 221 and the VOD content servers 222 and utilizes them to help deliver the video and audio streams that make up VOD services. In one embodiment, other media content managers and content servers (not shown) could run respectively in parallel to the VOD content manager 221 and VOD content servers 222 to provide other types of on-demand media content. The QAM modulators that comprise the QAM group 228 receive the MPEG-2 transport streams from the VOD content servers 222, convert them into encrypted RF signals at a specified frequency (channel), and transmit them to a DHCT 14 via the network 38.

The quadrature phase shift keying (QPSK) modem 226 is responsible for transporting the out-of-band IP (Internet protocol) datagram traffic between the distribution headend 26A and a DHCT 14. Data from the QPSK modem 226 is routed by headend router 227 within the headend 26A. The headend router 227 is also responsible for delivering upstream application traffic to the various server applications 219 & 220.

FIG. 3B is a block diagram of select portions of an example headend for providing broadcast services. Note that the headend components illustrated in FIG. 3A and FIG. 3B are equally applicable to a hub 34, and the same elements and principles may be implemented at a hub 34 instead of the headend 26 as described herein. The headend 26B receives content from a variety of service and content providers 18, which can provide input in a variety of ways. The headend 26B combines the content from the various sources and distributes the content to subscribers via distribution network 38.

In a typical system, the headend 26B receives input signals such as programming, services and other information from content providers 18 (FIG. 1). The input signals may be transmitted from sources to the headend 26B via a variety of transmission paths, including satellites (not shown), and terrestrial broadcast transmitter and antenna (not shown). The headend 26B can also receive content from a direct feed source 210 via a direct line 212. Other input sources from content providers 18 include a video camera 214 or an application server 216. Application server 216 can also be located at the headend 26B, among other locations. The application server 216 may include more than one line of communication 218. The signals provided by the content or programming input sources can include a single program or a multiplex that includes several programs.

The headend 26B generally includes one or more receivers 218 that are each associated with a content source. MPEG encoders, such as encoder 220, are included for digitally encoding things such as local programming or a feed from video camera 214. The output signal from encoder 220 is an MPEG program stream containing MPEG programming. The MPEG program stream may be multiplexed with input signals from switch 224, receiver 217 and control system (DNCS) 223. The multiplexing logic 222 processes the input signals and multiplexes at least a portion of the input signals into transport stream 240.

The switch, such as asynchronous transfer mode (ATM) switch 224, provides an interface to an application server 216. There can be multiple application servers 216 providing a variety of services such as a Pay-Per-View service, video on demand (VOD), a data service, an Internet service, a network system, or a telephone system. Service and content providers 18 (shown in FIG. 1) may download content to an application server 216 located within the DBDS 10. The application server 216 may be located within headend 26B or elsewhere within DBDS 10, such as in a hub 34.

The various inputs into the headend 26B are then combined with the other information from the control system 232, which is specific to the DBDS 10, such as local programming and control information, which can include among other things conditional access information. The headend 26B contains one or more modulators (or QAM Group) 228 to convert the received transport streams 240 into modulated output signals suitable for transmission over the transmission medium 250 through the network 38. Each modulator 228 may be a multimodulator including a plurality of modulators, such as, but not limited to, QAM modulators, that radio frequency modulate at least a portion of the input transport streams 240 and transmit therefrom output transport streams 242. The output signals 242 from the various modulators 228 or multimodulators are combined, using equipment such as a combiner 246, for input into the transmission medium 250, which is sent via the in-band delivery path 254 to the subscriber locations (not shown).

In one embodiment, the server 216 also provides DOCSIS data 218 to the headend 26B. The data is received by the media access control functionss 224, and in accordance with DOCSIS standards, each of the media access control functions 224 outputs MPEG transport packets containing DOCSIS data 226 instead of MPEG programming. As is well known to those of ordinary skill in the art, a packet identification (PID) has been reserved for DOCSIS data channels under the DOCSIS standards.

There are various types of interfaces for interconnecting headend equipment carrying MPEG transport data. The most commonly known is the asynchronous serial interface or ASI. ASI provides a high data capacity single wire interconnection. An ASI output interface preferably receives eight bit data words at a rate of up to 27 Mwords per second and codes them into ten bit words. These words are serialized and output as a 270 MB/s serial data stream. If no data is available from the source, the ASI interface 240 stuffs the link with a special ten-bit character which is discarded by the ASI receiver. This allows the interface to support data rates from zero b/s to 216 b/s. Since an ASI interface 240 will support the data rate requirement for multiple DOCSIS forward channels, it is desired to provide a scheme for multiplexing several DOCSIS signals onto a single ASI interface 240. This will allow equipment with multiple media access control functions to interface to modulator functions with a single data connection. Since all of the media access control functions 224 cannot have access to the ASI interface 240 simultaneously, there preferably is some sort of buffering, and a need to account for resulting time delays.

Multiplexing different media access control outputs 226 is not possible with typical dedicated QAM modulators, as each media access control functions 224 in conventional DOCSIS compliant systems is typically attached directly to a modulator 228 dedicated to one DOCSIS data stream. In the preferred embodiment, the media access control functions 224 are separated from the modulator 228. In this manner, multiple media access control functions 224 may be multiplexed into one DOCSIS data stream. Additionally, MPEG programming such as video or audio from a video camera 214 or other input source 210 may be multiplexed with the DOCSIS data into one stream of transport packets. In the multiplexed data stream some of the transport packets may contain DOCSIS data and other transport packets may contain MPEG programming (video and audio).

This embodiment allows a video QAM modulator 228 or multi-QAM modulator to be used to modulate a DOCSIS data stream. Additionally, this has the advantage of enabling a headend 26B or hub 34 to be used for different purposes at different times. By way of example, a headend 26B or hub 34 could be used to carry primarily DOCSIS data streams during one particular set of hours in the day, while MPEG programming, including video on demand (VOD) may be carried during different hours without the need to use different modulators 228.

The control system (DNCS) 223 enables the television system operator to control and monitor the functions and performance of the DBDS 10. The DNCS 223 interfaces with various components, via communication link 270, in order to monitor and/or control a variety of functions, including the channel lineup of the programming for the DBDS 10, billing for each subscriber, and conditional access for the content distributed to subscribers. Information, such as conditional access information, is communicated from the DNCS 223 to the multiplexing logic 222 where it is multiplexed into a transport stream 240.

Among other things, the DNCS 223 provides input to the modulator 228 for setting the operating parameters, such as selecting certain programs or portions of transport streams for inclusion in one or more output transport stream 242, system specific MPEG table packet organization, and/or conditional access information. Additionally, the control system 232 communicates with the multiplexing logic 222, and media access control functions 224 at initialization to synchronize counters used for time stamps. Control information and other data can be communicated to hubs 34 and DHCTs 14 via an in-band delivery path 254 or via an out-of-band delivery path 256.

The out-of-band data is transmitted via the out-of-band downstream path 80 of transmission medium 250 by means such as, but not limited to, a Quadrature Phase-Shift Keying (QPSK) modem 226. Two-way communication utilizes the upstream portion 80 of the out-of-band delivery system. Hubs 34 and DHCTs 14 transmit out of band data through the transmission medium 250, and the out of band data is received in headend 26B via out-of-band upstream paths 80. The out-of-band data is routed through router 227 to an application server 216 or to the DNCS 223. The out-of-band control information includes such information as a pay-per-view purchase instruction and a pause viewing command from the subscriber location to a video-on-demand type application server 216.

The DNCS 223, also monitors, controls, and coordinates all communications in the subscriber television system, including video, audio, and data. The control system 232 can be located at headend 26B or remotely.

The transmission medium 250 distributes signals from the headend 26B to the other elements in the subscriber television system, such as a hub 34, a node 42, and subscriber locations. The transmission medium 250 can incorporate one or more of a variety of media, such as optical fiber, coaxial cable, and hybrid fiber-coax (HFC), satellite, direct broadcast, or other transmission media.

FIG. 4 is a block diagram illustration of a DHCT 14 that is coupled to a headend 26 and to a television, in accordance with one embodiment. It will be understood that the DHCT 14 shown in FIG. 4 is merely illustrative and should not be construed as implying any limitations upon the scope of the preferred embodiments of the invention. Some of the functionality performed by applications executed in the DHCT 14 (such as the MOD client application 363 or EPG client application 397) may instead be performed at the headend 26 and vice versa, or not at all in some embodiments. A DHCT 14 is typically situated at a user's residence or place of business, etc., and may be a stand alone unit or integrated into another device such as, for example, a television set or a personal computer or other display devices, or an audio device.

The DHCT 14 can include one or more storage devices, such as storage device 373, preferably integrated into the DHCT 14 through an IDE or SCSI interface 375, or externally coupled to the DHCT 14 via a communication port 374. The storage device 373 can be optical (e.g. read/write compact disc), but is preferably a hard disk drive. Storage device 373 includes one or more media (not shown). In one implementation, the storage device medium has two partitions (not shown). One partition is for media content read/write access, and the other partition is for data storage (such as EPG data and minimal memory consuming media objects such as images or logos). Media content and media objects will be used interchangeably throughout the document, and will be understood to mean substantially the same thing. Media objects such as sprites (described below), depending on how long in time they are and how much memory is available in the DHCT 14, may need to be stored in the media content partition. If enough memory exists in the DHCT 14 to store an entire media object such as a sprite sequence that requires presentation over time, then it may be stored in the data portion and treated as data. Otherwise, it has to be stored in a partition or section of the storage device 373 specially formatted and designated for media content, to enable the streaming access off the storage device 373. This last partition may be shared with the PVR application 377 (described below), or it may be a third partition. The partitioning of the storage device 373, or rather, storage device medium, can be user configurable via the configuration manager (not shown), as described below. Herein, references to write and/or read operations to the storage device 373 will be understood to mean operations to the medium or media of the storage device 373 unless indicated otherwise.

A Storage Device Controller 379 in the storage device 373 of DHCT 14, in cooperation with device driver 311 and the operating system 353 (to be described below), grants access to write data to or read data from the local storage device 373. Processor 110 can transfer media content and/or data from System Memory 112 to the local storage device 373 or from the local storage device 373 to the system memory 112 by communication and acknowledgement with the Storage Device Controller 379. In one implementation, media content (such as movies, music, games, etc.) and/or data received from the subscriber TV network or from locally connected peripheral devices can be transferred from system memory 112 to the local storage device 373 or from the storage device 373 to system memory 112. Such operations, when effected, support data routing from or to the local storage device 373.

The DHCT 14 preferably includes a communications interface (or DBDS interface) 342 for receiving signals (video, audio and/or other data) from the headend 26 through the network 38 and for providing any reverse information to the headend 26 through the network 38. The DHCT 14 further includes at least one processor 110 for controlling operations of the DHCT 14, at least one output system 124 for driving the television display 341, and one or more tuners 345 for tuning into a particular television channel to be displayed and for receiving various types of data and/or media content from the headend 26. It will be understood that, although two tuners 345 are shown, the scope of the preferred embodiments of the invention also includes a DHCT 14 with more tuners or a single tuner. A two-tuner DHCT 14 provides conventional DHCT functionality through a dedicated tuner for that purpose and cable modem functionality through a second tuner dedicated to receive internet data and/or media content to be routed to the local physical storage device 373. Although a single processor 344 is shown, it will be understood that the preferred embodiments of the invention can include multiple processors which provide additional processing and compute capability to route data. Cable modem functionality preferably provisioned with the DOCSIS standard is received via a tuner and data routing to a peripheral device attached to the DHCT 14 is implemented by mapping MAC frames from/to: DOCSIS frames, Ethernet frames, or USB frames. Additional functionality in the data routing process includes data parsing, specialized data filtering, and data forwarding. Media content and/or data can also be intended to reside in the DHCT memory 112 or stored in the DHCT local storage device 373.

Also included within the DHCT 14 is an Out-of-Band (OOB) tuner and upstream transmitter 108 which is connected to the interface 342 to the DBDS 10. The OOB tuner and upstream transmitter 108 enables the DHCT 14 to interface with a DBDS 10 so that the DHCT 14 can provide upstream data to the DBDS 10, for example, via a QPSK channel or a QAM channel. In this manner, a DHCT 14 with a local physical storage device 373 can interact with the DBDS 10 to request services, service media content and/or service data, such as Pay-Per-View programming and View-On-Demand programs and/or comprehensive EPG data for desired programs, then receive and write to memory 112 the requested data or executable programs of services as data, and then transfer the data from memory 112 to a formatted designated or unused section of the local physical storage device 373. It should be appreciated that although the OOB tuner and upstream transmitter 108 are illustrated as one component in FIG. 4, the tuner and transmitter can be independent of each other and located separately within the DHCT 14. Nonetheless, both components must be in communication with the DBDS 10 (FIG. 1) so that upstream transmissions can be received by the system.

According to another embodiment of the invention, a telephone modem (not shown) in the DHCT 14 can be utilized for upstream data transmission and a headend 26, hub 34 or other component located upstream in the DBDS 10 can receive data from a telephone network corresponding with the telephone modem and can route the upstream data to a destination internal or external to the DBDS, such as an application data server in the headend 26 or Content Provider 18.

Referring again to the DHCT 14 shown in FIG. 4, after the one or more tuners 345 select one or more transmission channels, incoming data is forwarded to hardware 114, which comprises circuitry with capability for demodulating 116, demultiplexing and parsing 118, and decrypting 120 the incoming signals. One or more components of hardware 114 can be implemented with software, a combination of software and hardware, or preferably, in hardware. More specifically, the hardware components 114 are capable of QAM demodulation, Forward Error Correction (FEC), Parsing MPEG-2 Transport Streams, Packetized Elementary Streams and Elementary Streams, and Decryption, as is well known to those of ordinary skill in the art, to counter the effect of signal processing of broadcast media content and/or data in the headend 26 (FIG. 3). Analog signal processing module (ASPM) 999 includes other similar processing for analog signals, such as descramblers, decoders, digitizers, signal amplifiers, and other circuitry for signal or error recovery.

Another component of the DHCT 14 is the processor 110, which controls the functions of the DHCT 14 via a real-time, multi-threaded operating system 353 that enables task scheduling and switching capabilities. More specifically, the processor 110 operates to control specialized functions of the DHCT 14 enabled by the DHCT ability to receive a variety of content, such as media content and/or data, to write received media content and/or data into memory 112, and to transfer received media content and/or data from memory 112 to the local physical storage device 373 by reading the received data from memory 112 and writing to the local physical storage device 373, and to seamlessly support access to BFS files received through the DHCT network interface 342 and read/write access to files in the DHCT local storage device 373. Furthermore, according to one embodiment, the processor 110 executes instructions of application software, such as a software application program residing in System Memory 112 to receive and write media content and/or data to memory 112, and then transfer the media content and/or data from memory 112 to the local physical storage device 373 and then at a later time retrieving desired media content and/or data from the local storage device 373 by reading the desired media content and/or data from the local storage device 373 and writing it to memory 112 for presentation in the display. In this example, the DHCT 14 can receive and store the media content and/or data in the storage device 373 only if authorized to receive and store the media content and/or data.

In one implementation, the DHCT 14 includes system memory 112, which includes FLASH memory 351 and dynamic random access memory (DRAM) 352, for storing various applications, modules and data for execution and use by the processor 110. Basic functionality of the DHCT 14 is provided by an operating system 353 that is preferably stored in FLASH memory 351. Among other things, the operating system 353 includes at least one resource manager 367 that provides an interface to resources of the DHCT 14 such as, for example, computing resources. The operating system 353 further includes at least one device driver 311 that works in cooperation with the operating system 353 to provide operating instructions for peripheral devices, including but not limited to the storage device 373. The operating system 353 further includes the dual mode file system manager logic (DMFSML) 900, which comprises a set of hardware status check, open file, read, and write Application Program Interfaces (APIs) as described below.

One or more programmed software applications, herein referred to as applications or application clients, are executed by utilizing the computing resources in the DHCT 14. The application clients may be resident in FLASH memory 351 or downloaded (or uploaded) into DRAM 352 or the storage device 373, or stored in a combination of one or more of the DRAM 352, FLASH 351, and storage device 373. Applications stored in FLASH memory 351 or DRAM 352 or storage device 373 are executed by processor 110 (e.g., a central processing unit or digital signal processor) under the auspices of the operating system 353. Data required as input by an application is stored in DRAM 352 or FLASH memory 351 or storage device 373 (or a combination) and read by processor 110 as need be during the course of the application's execution. Input data may be stored in DRAM 352 by a secondary application or other source, either internal or external to the DHCT 14, or possibly anticipated by the application and thus created with the application at the time it was generated as a software application, in which case it is stored in FLASH memory 351. Data generated by an application is stored in DRAM 352 by processor 110 during the course of the application's execution, or if required, transferred to the storage device 373 from DRAM 352 by processor 110 during the course of the application's execution. The availability of data, location of data, whether in memory 112 or in the local storage device 373, and the amount of data generated by a first application for consumption by a secondary application is communicated by messages. Messages are communicated through the services of the operating system 353, such as interrupt or polling mechanisms or data sharing mechanisms such as semaphores. DRAM 352 also includes application memory 370 that various applications may use for storing and/or retrieving data.

Under normal operation without memory constraints, an application's data component is stored in memory 112, as discussed above. If the amount of memory is insufficient to accommodate all of the application's data allocation components, to vacate memory space, one or more parts of the data component of one or more applications in the DHCT 14 is transferred from memory 112 to the local storage device 373, resulting in storing the respective data components in the local storage device 373. When an application requires data stored in the storage device 373 and there is insufficient memory to store the required data, the application transfers and stores a second part of data from one or more data components from memory 112 to the local storage device 373 to make space in memory 112. The application then proceeds to transfer and store the required data from the storage device 373 to the vacated section of memory 112.

According to one aspect of the invention, the specification for requested media content and/or data generated by an application in the DHCT 14 in response to viewer input can include one or more of the currently tuned channels as the desired channels for which the requested data is to be transmitted. Hence, the DHCT 14 will receive media content and/or data, the processor 110 will interpret the media content and/or data received via one of multiple tuners 345, store the media content and/or data in the system memory 112, and process and display the requested media content and/or data to the viewer. Additionally, where a large amount of media content and/or data is requested by a viewer, the media content and/or data could be stored in the local storage device 373 as an alternative to storage in system memory 112. After storing the media content and/or data, the controlling application could then decode and interpret the media content and/or data so that requisite media content and/or data can be retrieved based upon a future viewer request for information. Additional functions with respect to an application executing in the DHCT 14 include receiving media content and or data (herein, media content will be understood to refer to media content and/or data unless referred to separately for clarification or to distinguish functionality that treats the media content and data differently) associated with programs and storing the media content in the system memory 112 and/or local physical storage device 373, receiving and interpreting both the version number of the media content and associated status information, as provided within data in the received media content or a subset thereof, discarding obsolete media content (e.g., corresponding to an older version), updating changed media content, updating a subset of media content periodically or upon notification by a server located at headend 26, and depending on state of the DHCT machine-state, effecting the selection of the most appropriate repository for storage of the received media content from a multiplicity of alternatives such as memory 112, memory in any peripheral device connected to the DHCT 14, any of one or a multiple of internal DHCT storage devices, or any externally-connected storage device to the DHCT.

An application referred to as navigator 355 is also resident in FLASH memory 351. Navigator 355 provides a navigation framework for services provided by the DHCT 14. For instance, the navigator 355 core functionality includes volume and configuration settings. The navigator 355 preferably handles channel navigation keys on the remote control device 380. It also preferably displays a channel banner with information about the selected channel. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu.

The FLASH memory 351 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 4 are a window manager 359 and a service application manager (SAM) client 357. The window manager 359 provides a mechanism for implementing the sharing of the display device screen regions and user input. The window manager 359 on the DHCT 14 is responsible for, as directed by one or more applications, implementing the creation, display, and de-allocation of the limited DHCT 14 screen resources. It allows multiple applications to share the screen by assigning ownership of screen regions, or windows.

The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 14 should receive data corresponding to the input key and in which order. As an application is executed, it registers a request to receive certain user input keys or commands, also called events. Events are the typical manner of communication between the operating system 353 and applications. When the user presses a key corresponding to one of the commands on the remote control device 380, the command is received by the receiver 346 and relayed to the processor 110. The processor 110 dispatches the event to the operating system 353 where it is forwarded to the window manager 359 which ultimately accesses the user input registry 350 and routes data corresponding to the incoming command to the appropriate application.

According to the preferred embodiment of the invention, the processor 110 executes commands or instructions provided by the programmed software applications, such as an EPG Application 397, stored in the system memory 112. The processor 110 may be directed to execute an application by a viewer when the viewer presses keys of the remote control device 380 and infrared signals are received through an infrared port, or receiver 346, in the DHCT 14. For instance, where a viewer requests data and/or media content stored in the local storage device 373, the application executing on processor 110 can cause processor 110 to generate a request message for data to be transferred from storage device 373 to memory 112 and then presented on the TV display. Likewise, a viewer may indirectly or directly request data and/or media content stored in a headend server and cause processor 110 to generate a request message for data to be sent via upstream transmitter 108 through RDC 80 (FIG. 2). This requested data is inserted into one or more DTCs, such as an on-demand DTC received by the OOB tuner 108. Alternatively, the requested data can be inserted in a carousel DTC 68. The DHCT 14 then receives requested data that is transmitted via one of the DTCs, the processor 110 stores the data in memory 112 and displays while also transferring a copy of the data to the local storage device 373 for quicker access in the future.

The SAM client 357 is a client component of a client-server pair of components, with the server component being located on the headend 26, typically in DNCS 223. A SAM database 360 (i.e. structured data such as a database or data structure) in DRAM 352 includes a data structure of services and a data structure of channels that are created and updated by the headend 26. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 362), pay-per-view events (available through a PPV application 364), digital music (not shown), media-on-demand (available through an MOD application 363), and an electronic program guide (EPG) (available through an EPG application 397). In general, the identification of a service includes the identification of an executable application that provides the service along with a set of application-dependent parameters that indicate to the application the service to be provided. For example, a service of presenting a television program could be executed by WatchTV application 362 with a set of parameters to view HBO or with a separate set of parameters to view CNN. Each association of the application component (tune video) and one parameter component (HBO or CNN) represents a particular service that has a unique service I.D. The SAM 357 also provisions for invoking a second application in response to a first application request to launch the second application. Hence, it is possible through an Application Programming Interface (API) for any application in the DHCT 14, including the navigator 355, to request an application stored in the DHCT 14 storage device 373 to launch by first transferring the application's executable program from the storage device 373 to memory 112 and allocating memory 112 and/or storage capacity for data input and output. The SAM client 357 also interfaces with the resource manager 367, as discussed below, to control resources of the DHCT 14.

Application clients can also be downloaded into DRAM 352 at the request of the SAM client 357, typically in response to a request by the user or in response to a message from the headend 26. In the example DHCT 14 depicted in FIG. 4, DRAM 352 contains a media-on-demand application (MOD) 363, an e-mail application 365, an EPG application 397, and a web browser application 366. It should be clear to one with ordinary skill in the art that these applications are not limiting and merely serve as examples for this present embodiment of the invention. Furthermore, one or more DRAM based applications may be, as an alternative embodiment, resident in FLASH memory 351. These applications, and others provided by the cable system operator, are top level software entities on the network for providing services to the user.

In one implementation, applications executing on the DHCT 14 work with the navigator 355 by abiding by several guidelines. First, an application client responds to and interacts with the SAM client 357 for the activation and suspension of services. Such services were preferably provisioned by the application's server in the headend 26, by interacting with the SAM server 225 (FIG. 3). Second, an application shares DHCT 14 resources with other applications and abides by the resource management policies of the SAM client 357, the resource manager 367, the operating system 353, and the DHCT 14. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client is designed to not have access to certain user input keys reserved by the navigator (i.e., power, channel +/−, volume +/−, etc.).

The MOD client application 363 provides the user with lists of available media content titles to choose from and with video presentations requested by the user. The MOD client application 363 provides video presentations to the user by engaging, preferably, in a direct two-way IP (Internet Protocol) connection with VOD content servers 222 (FIG. 3). The MOD client application 363 is also responsible for providing reminder and filing functionality. In an alternative embodiment, the reminder and/or filing functionality is provided by a separate application that can be selectively aggregated to the MOD client application 363 for purposes of charging separately for that functionality.

The MOD client application 363 execution effects access to a database of records containing information pertaining to media content. This MOD database is supported by the client-server MOD counterparts, MOD server application 219 (FIG. 3) and MOD client 363. The MOD client 363 accesses information in the MOD database (not shown) in memory 352 for presentation to a subscriber. The MOD database contains sufficient information for the presentation of available media content titles at the current time and during subsequent periods. The MOD server application 219 in communication with MOD client 363 effects updates to the MOD database stored in memory 352 or stored in a storage device 373 coupled to DHCT 14. MOD client 363 reads records of the MOD database and processes them into a displayable representation as part of a graphical user interface (GUI) displayed on a television 341 or similar display device for presentation to a subscriber.

Execution of electronic program guide (EPG) client application 397 effects access to a database 399 of records containing information pertaining to programs (i.e. media content). This EPG database 399 is supported by the client-server EPG counterparts, EPG server application 220, and EPG client 397. The EPG client 397 accesses information in the EPG database 399 in memory 351 for presentation to a subscriber. EPG data typically consists of information describing program attributes such as program starting times and duration, program title, program description, running time, channel identification, actors in program, parental rating, program categories and genre, and audio features (stereo, SAP, mono, Close-Caption, Teletext). The EPG database 399 contains sufficient information for the presentation of available program titles (i.e. media content titles) at the current time and during subsequent periods. The EPG server application 220 (FIG. 3) in communication with EPG client 397 effects updates to the EPG database 399 stored in memory 351 or stored in a storage device 373. The EPG data may be organized into sets or subsets in any of multiple ways keyed by one or more of the program attributes. When organized by program start time, it facilitates updating the EPG database 399 in the DHCT 14 as the data for past programs becomes obsolete. Multiple versions of each program's title, short description, or other descriptive program attributes are retained in the DHCT memory 112 or local storage device 373. EPG client 397 reads records of the EPG database 399 and processes them into a displayable representation as part of a graphical user interface (GUI) displayed on a television 341 or similar display device for presentation to a subscriber. Depending on the space available to display the desired program information on the screen, the appropriate version or instance of the program information that fits within the designated space is employed. Abbreviated or elaborate versions of program information are desirous for the different EPG presentations (or views). They are also beneficial for use in the presentation of the EPG data in a channel-time grid because the space available to display information will change with the progression of time and with subscriber invoked navigation in the time axis.

Program description may consist of two versions, a shorter description suitable to be stored in the DHCT memory 112 and a longer program description that the subscriber can access from the EPG data stored in the local storage device 373 by pressing a key on the remote control device 380. A small image representation of the designated key to press to retrieve a program's Long Description is displayed in the EPG's Graphical User Interface (GUI) adjacent to textual information conveying "Long Description" or similar, possibly shorter, information (not shown).

Yet another application, Configuring Manager (not shown), can allow a subscriber to select the manner in which a portion of the capacity of the local physical storage device 373 is to be utilized. For example, a subscriber may configure part of the storage capacity of the local storage device 373 to retain additional days of EPG program data. A subscriber can customize the configurable aspect of portions of local storage device 373 allowed to be customized by first entering an interactive configuration session (not shown) that results in his/her preferences selection and storing such preferences as data in system memory 112 or in the local storage device 373 itself. Once a subscriber sets storage device 373 utilization preferences via an interactive configuration session, the assignment of local storage capacity will conform to the subscriber's saved preferences. Saved preferences are retained until modified. Additional preference selection can include a preferred way or a prioritized order of preferences in which the storage capacity of the local storage device 373 is to be employed and the time elapsed for a particular stored data or media content type to be given less precedence or erased. (Erased herein can merely imply that storage capacity employed by a data becomes reusable). The subscriber can select from a multiplicity of prioritized alternatives during the interactive configuration session. The interactive configuration session displays questions and potential consequences to the subscriber for each of the alternate methods for storage capacity assignment and assignment of priority to different data types.

An executable program or algorithm corresponding to an operating system (OS) component, or to a client platform component, or to a client application, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an OS component, or to a client platform component, or to a client application, or to respective parts thereof, can reside in FLASH memory 351, or in a local storage device coupled to DHCT 14 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device for storage purposes.

Also included within the DHCT 14 is a Graphics/Media engine 132 that further processes signals for output via output system 124 to a television set 341 or display. The output system 124 preferably comprises an RF Channel 3 and 4 output to drive an analog TV or Display or other device such as a VCR, as well as an output video port to drive a display, monitor or TV set that receives an analog TV signal at its input. Additionally, it should be appreciated that the TV or display may be connected to the DHCT 14 via a video port such as Composite Video, S-Video, or Component Video. The output system 124 can also comprise Digital Component Video or an IEEE-1394 interface to drive a TV or Display that receives non-compressed digital TV signals at its input. The Graphics/Media engine 132 includes components for analog and digital video decoding, as well as analog and digital audio decoding, as are well known to those of ordinary skill in the art.

As shown in FIG. 4, components of the DHCT 14 include an analog descrambler and analog video decoder (analog signal processing module (ASPM) 999) with capability for analog video or audio descrambling, and a security processor 130 working in conjunction with a decryptor 120 to decrypt encrypted digital video, audio or data, as is well known to those of ordinary skill in the art. The security processor 130 functions to authorize paying subscribers DHCTs to execute specialized features of the DHCT 14, such as executing the application and receiving media content and/or data allowed to be received by only those DHCTs that contain a local storage device 373. The security processor 130 is a secure element for performing security and conditional access related functions. More particularly, the security processor 130 functions to authorize a paying subscriber's DHCT 14 to execute specialized functionality of the DHCT 14, such as receiving and decrypting (or descrambling) encrypted (or scrambled) media content and other data sent from a remote device. Security processor 130 preferably includes a microprocessor and a memory that only the microprocessor of the security processor 130 may access. Preferably, security processor 130 is contained in a tamper proof package. With reference to FIG. 3, in one implementation, encryption is applied to the data stream of requested media content at the QAM group 228 at the headend 26 according to encryption methods well-known to those of ordinary skill in the art. An encryption component resident in the QAM group 228 in the headend 26 and under the direction of the DNCS 223 encrypts, for example, MPEG-2 transport stream packets used to transmit the media content. The encrypted media content also includes, in one embodiment, entitlement control messages that are recognized by the security processor 130 (FIG. 4) at the DHCT 14 as information needed to decrypt the encrypted media content. Security processor 130 preferably stores authorization information, wherein the authorization information indicates that the subscriber is entitled to access the media content. The authorization information is obtained from one or more entitlement messages sent by the headend 26 after, or concurrently with, initialization of the DHCT 14 into a purchased service. If the authorization information indicates that the subscriber is entitled to the media content, security processor 130 generates a code word or key based on the authorization information and the received entitlement control message, and the security processor 130 uses this key to decrypt the encrypted media content at the decryptor 120.

The DHCT 14 also includes a memory controller 134 and a Media Memory 126. These components can include software and/or hardware to compose and store graphical information created by the processor 110. These components enable the compositing of graphical data with video into a picture for a TV display as provided by capabilities in Graphics/Media Engine 132.

Next, a description of the related functions of the Graphics/Media engine 132, system memory 112, processor 110 and Media Memory 126 will be described with reference to FIG. 4, according to one aspect of the invention. First, compressed video and audio streams received through an in-band tuner or read from the local storage device 373 is deposited continuously into a compressed audio and video section 127 of the Media Memory 126. Thereafter, as shown in FIG. 4, one or more video decoders 136 in the DHCT 14, and more specifically, within the Graphics/Media engine 132, decompress compressed MPEG-2 Main Profile/Main Level video streams read into a video decoder 136 from the Media Memory's compressed video buffer 127. Each picture decompressed by the video decoder 136 is written to a picture buffer 129 in the Media Memory 126, where the reconstructed pictures are retained.

Alternatively, the pictures may be decompressed in the video decoder 136, then scaled down as they are being reconstructed in a procedural fashion by feeding data of the reconstructed pictures in raster-scan order from the video decoder 136 to the video scaling unit 160. According to this alternative, the scaled down reconstructed picture can be stored in one of multiple scaled video picture buffers 137 in Media Memory 126 in raster-scan order as they are reconstructed, such that a respective scaled video picture buffer 137 is dedicated to the motion video picture of a program or video object (read from the local storage device 373) and included in the displayed presentation.

Additionally, one or more Digital Audio Decoders 138 in the DHCT 14 can decode the compressed digital audio streams associated with the compressed digital video or read as an audio object from the local storage device 373 in a similar fashion, allocating respective buffers as necessary. It should be appreciated that in some implementations only one audio buffer may be required. The preferred embodiment of the invention enables the simultaneous display of multiple video pictures, some broadcast programs, and others read as media objects from the local storage device 373, with respective graphical and textual information. Graphical and textual objects are displayed, for instance via application invocation of a standard library of graphics or objects as is well known to those of ordinary skill in the art, which may be provided by the operating system 353. Once created and stored in system memory 112, the graphical and textual objects are transferred by processor 110 from system memory 112 to the Media Memory 126, either to the Off-screen Composition Buffer 131 or, in another aspect of the invention, directly to the Display Buffer 135. Alternatively, the graphical and textual objects are rendered directly in the Display Buffer 135. According to one aspect of the invention, the system memory 112 and Media Memory 126 may be unified as one physical memory device.

Continuing with FIG. 4, one or more Video Scaling Units effectuate resizing of video pictures and storage to Media Memory 126. A reconstructed digital video picture is read from the Media Memory 126 and fed into a Video Scaling Unit 160 to accomplish the scaling of the video. The scaled video is then stored in a Scaled Video Picture Buffer 137 in Media Memory 126. The Scaled Video Picture Buffer 137 in the Media Memory 126 is updated at the video picture rate or a fraction thereof for display as part of the displayed presentation at designated spatial locations.

According to one aspect of the invention, each video decoder 136 can be assigned to decompress a respective compressed video stream, and respective video scaling units may also be assigned. Each video stream can either originate from a broadcast TV channel or from a read video object stored in the local storage device 373.

A Digital Video Encoder (DENC) 123 converts reconstructed video data received at its input to an analog video signal that drives a connected TV Display. Data is fed to the DENC 123 from Media Memory 126 in a manner to produce a raster scan of displayed pixels consistent with the display type connected to the DHCT 14. For an NTSC Display, the DENC 123 can receive the equivalent of 30 pictures per second, each picture of spatial resolution equal to 720×480 pixels, each pixel an average data entity of 1.5 bytes.

It should be appreciated that the Media Memory 126 is a memory of finite number of bytes, and it serves as a repository for different data components. Compressed MPEG-2 video streams are deposited in a section of Media Memory 126 allocated for compressed video. Likewise, compressed digital audio streams are deposited in a section of Media Memory 126 allocated for compressed audio. The Digital Audio Decoder 138 stores decompressed audio in a similar section of Media Memory 126 dedicated to store reconstructed audio. Decompressed audio is fed into an audio port (not shown) for playback.

A Memory Controller 134 in the DHCT 14 grants access to transfer data from system memory 112 to the Display Buffer 135 in Media Memory 126 in a timely way that safeguards from the generation of tear artifacts on the TV display. Data transfer is granted to locations in the Display Buffer 135 corresponding to locations already passed by the raster-scan ordered data fed from Display Buffer 135 into the DENC 123. Thus, data written to the Display Buffer 135 is always behind (in raster-scan order) the Display Buffer 135 locations read and fed into the DENC 123. Alternatively, data can be written to a secondary Display Buffer, also called an Off-Screen or Composition Buffer 131. The Off-Screen Buffer 131, or parts thereof, are then transferred to the Display Buffer 135 by effecting a Media Memory 126 to Media Memory 126 data transfer during suitable times (e.g., during the vertical blanking video interval). The Off-Screen Buffer 131 and Display Buffer 135 can be alternated in meaning under program control upon completion of writing all objects into the Off-Screen Buffer. The Memory Controller 134 uses a pointer that points to the beginning of the Display Buffer 135 and another pointer that points to the beginning of the Off-Screen Buffer 131. Both pointers are stored in either memory 112 or special registers internal to the Memory Controller 134. Therefore, to effectuate alternating the meaning of the Display Buffer 135 and the Off-Screen Buffer 131, the content of the two pointer repositories are swapped.

A subscriber TV network comprises of a plurality of DHCTs 14 spanning different levels of features and functionality. Specifically, a first DHCT in a digital subscriber TV network has a locally connected physical storage device (or local file system), such as storage device 373, and a second DHCT does not contain any local physical storage device. Hence, a first DHCT with a physical local storage device connected in a digital Cable TV network must continue to operate with the mechanisms of the network that provisions all interconnected and serviced DHCTs, including those DHCTs without local physical storage. Therefore, a first DHCT in a digital subscriber TV network (or subscriber network TV system) must continue to benefit from storage located at the headend 26 (or at other remote locations) in the digital subscriber TV network for a number of reasons while simultaneously enhancing the TV viewing experience with functionality extended by a physical local storage device such as a hard drive (magnetic) or a CD-RW (optical) that is internal to the DHCT or externally connected to the DHCT 16 via a storage device interface (e.g., IDE or SCSI interface) or communication port such as USB or IEEE-1394. Since not all DHCTs in a digital subscriber TV network will have a local physical storage device, efficient network management results when a DHCT with a storage device is backwards compatible with existing network communication mechanisms and data download methods for DHCT's without local storage devices. Thus, a DHCT with a local physical storage device, such as storage device 373, can operate with the same logical file system and with the inherent broadcast data transmission aspect of digital subscriber TV networks. In one embodiment of the invention, software and data downloads are implemented with a Broadcast File System (BFS) transmitted in a Data Carousel fashion to provision all DHCTs in the digital subscriber TV network with local virtual storage. Such file system abstraction functions as a local virtual storage device in the DHCT. Therefore, it is evident that a DHCT with one or more local physical storage devices, in accordance with the preferred embodiment, can function in compliance to the existing file system abstraction and exploit the additional local physical storage for extending new functionality or enhancements to existing functionality to the subscriber.

In accordance with the preferred embodiment, the aforementioned dual mode file system is implemented with the operating system 353 via a set of operating system Application Programming Interfaces (API) that enables third party applications to conform to two files systems to both efficiently use existing storage and memory, while providing for enhanced viewer experiences. The APIs of the operating system 353 will collectively be referred to as dual mode file system manager logic (DMFSML) 900, unless reference to individual APIs of the DMFSML is needed for clarity or explanation. The preferred embodiment will be discussed initially with reference to an EPG application 397 and extended data provisions for the EPG application 397, although it will be understood that other applications or functionality are within the scope of the DMFSML 900 described for the preferred embodiment. For instance, the DMFSML and the consequent benefits which include storing media content and/or data in the local storage device while simultaneously using locally and remotely stored media content and/or data as described herein can apply to retrieving and storing and using locally and remotely stored media content and/or data associated with Pay-Per-View channels and Video-On-Demand (VOD) channels.

Subscribers with a DHCT 14 with a local storage device, such as storage device 373, can receive a more comprehensive EPG service since EPG associated data and media content can be stored in the local storage device 373. By paying a monthly fee, according to one implementation, subscribers have authorized access to the EPG data through the EPG Application 397 that executes in the DHCT 14, in communication with Security Processor 130 and possibly other Conditional Access in components in the DHCT 14 and headend 26. The EPG application 397 executes by employing the compute resources of the DHCT 14 (for example, memory 112 and processor 110), accessing EPG data through a mechanism that receives and coalesces EPG Data using one of a multiplicity of ways of receiving the EPG data into the DHCT 14. The EPG daemon task, described below, within an authorized DHCT 14 can receive and organize EPG data into an EPG database 399 in the DHCT 14, which is located within the system memory 112, Media Memory 126, or both, or at a storage device 373 within the DHCT 14 or a storage device externally connected to the DHCT 14 (not shown), or a combination of one or more of the aforementioned sources for EPG data. Receiving EPG data may require receiving EPG data subsets through different channels, possibly in-band or out-of-band (OOB) channels, or both.

EPG data typically spans program information for the complete channel line-up, be it hundreds or possibly thousands of channels, for a pre-specified time-window (e.g., 14 or 30 days). An individual service (e.g., NBC, HBO, Video-On-Demand, Email) is typically associated with each channel. Since the duration of programs vary and is typically from 30 minutes to 150 minutes, a channel could possibly offer 48 programs per day. If program durations are as short as five minutes, this could result in over 100 programs per day. Considering the number of programs per day for each channel, the number of channels, and the number of days of program information, the EPG data can demand an amount of memory that surpasses the typical memory limits of a low-cost, high-volume subscriber device. Alternatively, depending on the processor capabilities of the DHCT 14, it may be more efficient to perform sorting operations on the EPG data at the headend 26. In such embodiments the EPG Server 220 (FIG. 3A) or BFS server 228 includes EPG data for multiple sorts such as program theme or title, all of which can be simultaneously accessed and downloaded into a DHCT 14. In such a configuration, the memory requirements for the EPG database are much greater.

The EPG application 397 is provisioned to provide programming information for a standard amount of days (i.e. standard data), typically 14 days. FIG. 5 is a screen diagram illustration of an EPG guide based on a time view. Other views can be invoked through user input, including but not limited to theme views or title views. The EPG application client 397 is also preferably provisioned with the capability to handle extended data that provides enhanced attributes such as extra days of programming information (e.g. 30 days programming) beyond the standard data, and/or long description information for each program. The extended data provision is "dormant" until the EPG application 397 is alerted (preferably via the DMFSML 900) to the existence of certain DHCT resources, for example, a storage device 373, to receive and use the extended data.

Assume a first time DHCT start-up where the EPG application 397 is invoked by a user. In one implementation, the invocation of the EPG application 397 causes a dual mode file system manager (DMFSML) hardware status check API 901 to prompt a hardware query of the DHCT 14 resources to determine if a storage device, such as storage device 373, is connected (to enable standard and extended services for the EPG application). The operating system 353 communicates with the IDE (or SCSI) interface 375 and communication ports 374, and is advised by one or more of these components as to the connection status of a storage device (internally or externally connected). Alternatively, this hardware status information, or parts thereof, can be available via configuration information at boot time. In other embodiments, the IDE (or SCSI) interface 375 (or communication ports 374) can communicate status and available capacity of any connected storage device to the operating system 353 at boot time or periodically through polling mechanisms to software or hardware components of the DHCT 14. The operating system 353 communicates the status information to the EPG application 397. In response to the knowledge of the storage device connection, the EPG application preferably provides the user with the example barker 72 of FIG. 6 overlayed on the EPG screen 70. Other formats may be used to alert the user, such as providing a text message at the bottom of the screen, dimming the EPG table, etc. In other embodiments, the user need not be alerted to the storage device, and the mechanisms to provide the user with a dual mode file system can occur without the barker or other user feedback. As illustrated, the example barker 72 prompts the user to respond whether he or she would desire the extended EPG service. A similar screen can be invoked by the operating system 353 or any controlling application at start-up, during an interactive configuration phase at any time, or when the storage device is added (if externally coupled to the DHCT 16) for the first time.

If the user declines the extended service, standard EPG operation occurs as already discussed. If the user elects the extended data, a DMFSML open file API 902 to a first file system (operating as a virtual file system—i.e a physical storage device such as a server computer, for example, at some remote location such as the headend of the subscriber television network)) is invoked by the EPG application 397, requesting EPG standard and extended data. This first file system can be located at a remote EPG server 200 (FIG. 3A), or other server, but is preferably located at the BFS server 228 (FIG. 3A) where the data cycles in a data carousel and is accessible via the BFS client 343 (FIG. 4). The standard and extended programming data comprise two time windows demarcated by program time periods relative to the time/clock mechanisms in the DHCT 14, as described below. Once the data is found, a DMFSML read API 903 and DMFSML write API 904 preferably causes the processor 110 (FIG. 4) to retrieve the data corresponding to the standard time window and store the standard data in system memory 449, respectively. The DMFSML read API 903 and write API 904 also preferably causes the extended data corresponding to the second time window to be retrieved and stored in the second file system (i.e. the storage device), respectively. In effect, through the mechanisms of the DMFSML 900, a DHCT 14, when coupled with a storage device (i.e. local physical storage), transitions from a DHCT 14 operating with memory and virtual storage (via BFS server 228) to a dual mode file system that utilizes both virtual storage and local physical storage (along with internal memory).

After the first-time start-up, the disconnection of any external storage device (or inoperability of an external storage device or internal storage device 373) can be detected when DMFSML hardware status check API 901 is invoked, resulting in the controlling application providing a barker (not shown) that extended service is unavailable (e.g. disconnected, inoperable)or limited due to a disconnected or inoperable storage device. The DHCT 14, without an externally connected storage device or internal storage device, such as storage device 373, returns to using the first file system (virtual file system) and system memory 349 as the repository for EPG data until a local storage device becomes available.

Once the DMFSML 900 provisions the DHCT 14 for operating under a dual mode file system, the EPG application handles data updates. Under the auspices of a real-time operating system, executing on a processor 110 in the DHCT 14 and capable of task scheduling and switching, an EPG application 397 has a data gathering mechanism running continuously as a background task to receive EPG data. When collected, the data can be stored in the DHCT system memory 112 or in the local storage device 373. This EPG data gathering mechanism, hereinafter referred to as an EPG daemon task, receives EPG data corresponding to a first time-window and stores such EPG data for a pre-specified period of time in the DHCT system memory 112 and receives EPG data corresponding to a longer second time-window and stores such EPG data for a pre-specified period of time in the DHCT local storage device 373. This mechanism can be employed at power-up and/or during periodic updates that for instance occur at pre-determined times (such as midnight) or upon change to the data on the EPG server 220 (FIG. 3A) and subsequent notification of the client that new data is available.

As the DHCT 14 has an internal clock and timers 121 and 122, transmission of data packets containing a time specification from the headend 26 enables the DHCT 14 to synchronize its clock and keep track of time and intervals of time. According to one aspect of the invention, the timers 121 and 122 can count down to a time that initiates the processor 110 to signal the EPG daemon task to "wake up" to retrieve transmitted EPG data. The EPG daemon task of the EPG application 397 (FIG. 4) has a number of methods in which to receive EPG data. Because EPG data corresponding to a longer second time window is stored in the local storage device 373, the EPG daemon task has to request data from the network less frequently. Instead, as EPG data in memory 112 (FIG. 4) becomes obsolete as time progresses, EPG data corresponding to the first time window is transferred from the local storage device 373 to the DHCT's system memory 112. In addition, data that could not be typically retained in DHCT's memory and would have to be retrieved from the network's EPG server 220 (FIG. 3A) can be stored in the local storage device 373 (FIG. 4). Therefore, wherein a traditional EPG running in a DHCT without a local storage device would impose latencies in retrieval of EPG data not stored in memory by accessing the network, the preferred embodiment of the invention herein allows EPG data to be stored in the local storage device and retrieved rapidly when demanded by the viewer.

For DHCTs without a local storage device, the large number of programs, program information or attributes associated with the extended EPG data may exceed DHCT memory. Information that does not fit in memory can be retrieved from the EPG Server 220 via the BFS at headend 26 upon a subscriber's on-demand request. For instance, program Long Descriptions (a detailed description of a program) and program Previews (a short video-audio clip similar to a movie preview that advertises a program) (not shown) demand excessive memory, and thus they are typically not stored in the DHCT 14 but rather are accessed on-demand from the EPG server 220 using the BFS (FIG. 3A). The subscriber invokes a request for additional program information preferably by pressing a key, or sequence of keys, on the DHCT's remote control unit or keys on an alternative input device such as on a front panel of the DHCT 14. Alternatively, the on-demand request may be generated as a result of pressing a key or sequence of keys on a keyboard or generating a command with an input device. Such invocation results in signals received by receiver 346, or a similar input port, be it wired or wireless, that interrupts or signals the processor 110 and provides the viewers input to the processor in a data format that is recognizable by the processor.

In one embodiment, the DHCT 14 stores most or all of the aforementioned extended EPG-related data or media in the DHCT local storage device, rather than in the EPG server 220 or BFS server 228 at the headend 26A (FIG. 3A). It can also reduce the amount of memory in DHCT required to store EPG data. Further, the DHCT with the storage device 373 allows quick access to EPG data by reading priori stored EPG from the local storage. Once the EPG data intended to reside in the DHCT's system memory 112 (FIG. 4) is received and stored in the local storage device and/or memory of DHCT 14, it offers instant access to program information.

Other enhanced EPG functionality resulting from the extended EPG service includes retrieval of a preview video clip (not shown) associated with a program from the local storage device upon a subscriber's on-demand request. Such preview video can be pertaining to a program with a future start time or a currently running program. Preview video for a currently running program could be featured only for those programs with a long running time.

As time progresses, EPG data retained in the DHCT's memory is periodically updated. Data becomes obsolete as time progresses since part of the EPG data time-window becomes past. In one aspect of the invention, the navigator 355 (FIG. 4) enables the viewer to interact with programs that have associated hyper-linked media objects and access the Internet for more information. If the EPG application 397 (FIG. 4) is asked to unload its data from the DHCT memory 112 to allow requested Internet data to be written to memory 112, the EPG data can be reloaded at a future time directly from the local storage device 373 if a copy is stored in the local storage device 373 (FIG. 4). Otherwise, the EPG data can be retrieved from the EPG server 220 via the BFS (FIG. 3A).

In another implementation of the DMFSML 900, in accordance with the preferred embodiment, media objects, or media content, received from the subscriber TV network are stored in the DHCT 14 storage device 373 for later use by a software application running on the DHCT 14, resulting in rapid access to media objects that augment the TV viewing experience. The DMFSML hardware status check API 901 can be invoked when the WatchTV application 362 is invoked, or at start-up, or when a storage device is added to the DHCT 14. As discussed above, a GUI can be presented to the user advising them of enhanced functionality pertaining to the existence of an externally connected storage device, or an internally connected storage device such as storage device 373. A request for this enhanced functionality can cause the application to use the DMFSML open file API 902 and the read API 903 and write API 904 to cause media objects to be stored in a local file on the DHCT storage device 373 from a source file on the network (i.e. virtual file system). Thus, the DMFSML 900 enables the DHCT 14 to simultaneously use the virtual and physical storage to enhance the viewer experience.

Figure 7:
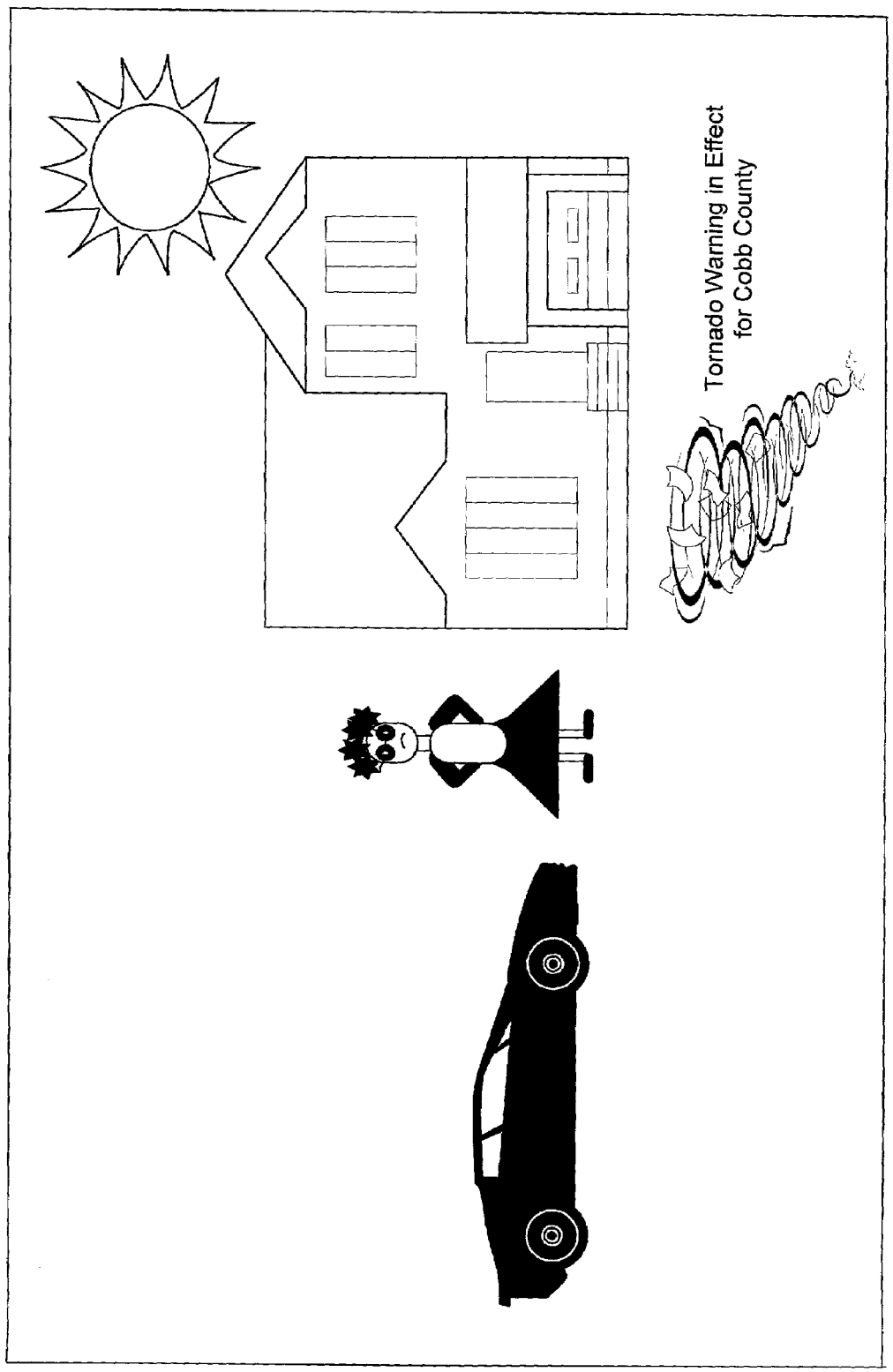
FIG. 7 is a screen diagram illustration of a broadcast program presented on a screen display, with a sprite at the bottom of the display, in accordance with one embodiment of the invention.

Media objects such as graphical animation clips, or sprites, can be stored in the storage device 373 and retrieved when necessary to alert the viewer with animation of alerts and messages. For example, an animated clip of a tornado is presented in a corner of the display when a tornado warning is received, as illustrated in FIG. 7. As another example, in an email application, after the DMFSML 900 has caused the download of sprites, a particular animation clip such as a rotating correspondence envelope can be used to notify the viewer that he/she has received email. The navigator 355 or a software application running in the DHCT 14 reads these media objects from storage device 373 and transfers them to memory 112 for execution by processor 110 to present the media objects in the presentation displayed to the viewer through the display.

Likewise, comprehensive Tutorial and Help sessions are augmented with media objects such as digital video clips with or without corresponding synchronized audio clips, animated clips with or without corresponding synchronized audio clips, or audio clips alone. Channel logos are versioned as animated clips and retrieved from the storage device 373 where they have been previously stored. Upon a channel change, an animated channel logo is displayed within the spatial extent of the channel banner presentation at the bottom of the display; such channel banner includes a brief program information with the channel number.

Sprites are invoked for TV in a similar manner to the way the channel logo is presented. A service can have a logo, either black and white or in color. Either of the two can be presented on service invocation. When a service is invoked by channel tuning, then the logo appears on channel banner for the short period of time that the channel banner is displayed. Likewise, a video widget (object with motion but not moving across screen) can be positioned where the logo would typically appear rather than a logo (when the service has this superior identification object for presentation).

An application, such as the navigator application 355 (FIG. 4), displays the sprite on a channel banner (or across a screen if it is a transitional sprite) whenever it is required to display the channel banner. Display of a channel banner is prompted upon pressing a key on the remote control device 380, or upon changing to a different channel (including channel surfing up/down). It also appears on special views of channel banner such as in the EPG. The sprite is a media content, or media object, associated with the service. The association of the media object to the particular service (for example, WatchTV) is provisioned via the SAM database 360, accessed through the SAM client 357 (FIG. 4). Additional presentations of media objects that ordinarily consume significant memory amounts are also possible. That is, the tornado sprite, or video widget (the terms video widget, widget, animated widget and sprite will be understood to mean the same, or substantially the same thing), is not necessarily for service identification but for an enhancement of service rendering. The video widget identifies an event such as an emergency or cautionary event.

In another implementation of the DMFSML 900, in accordance with the preferred embodiment, a DHCT 14 with a storage device, such as storage device 373, can be employed to store hyper-linked media objects associated with a broadcast TV channel in an orchestrated fashion in which the stream of hyper-linked media objects (e.g., audio, video, graphics or text data) associated with the TV channel's program is transmitted continuously by a finite amount of time ahead of the program's start-time. The storage device, such as storage device 373, can serve as a repository for media objects that are sourced from the web or a broadcast program (or other media content) in advance of a scheduled program. In a web-access link, the DHCT 14 can cause the download of the linked information into the storage device prior to the user being given notification that the link is available. If the user requests the link, then the information does not need to be retrieved from the network because it is already cached locally. In a DHCT 14 with a single in-band tuner that is being used to watch, for instance, a television program, the web information caching aspect of the preferred embodiment provides the viewer with high speed data access (i.e. high speed relative to an out-of-band channel) without interrupting TV viewing for a web-link.

Figure 8:
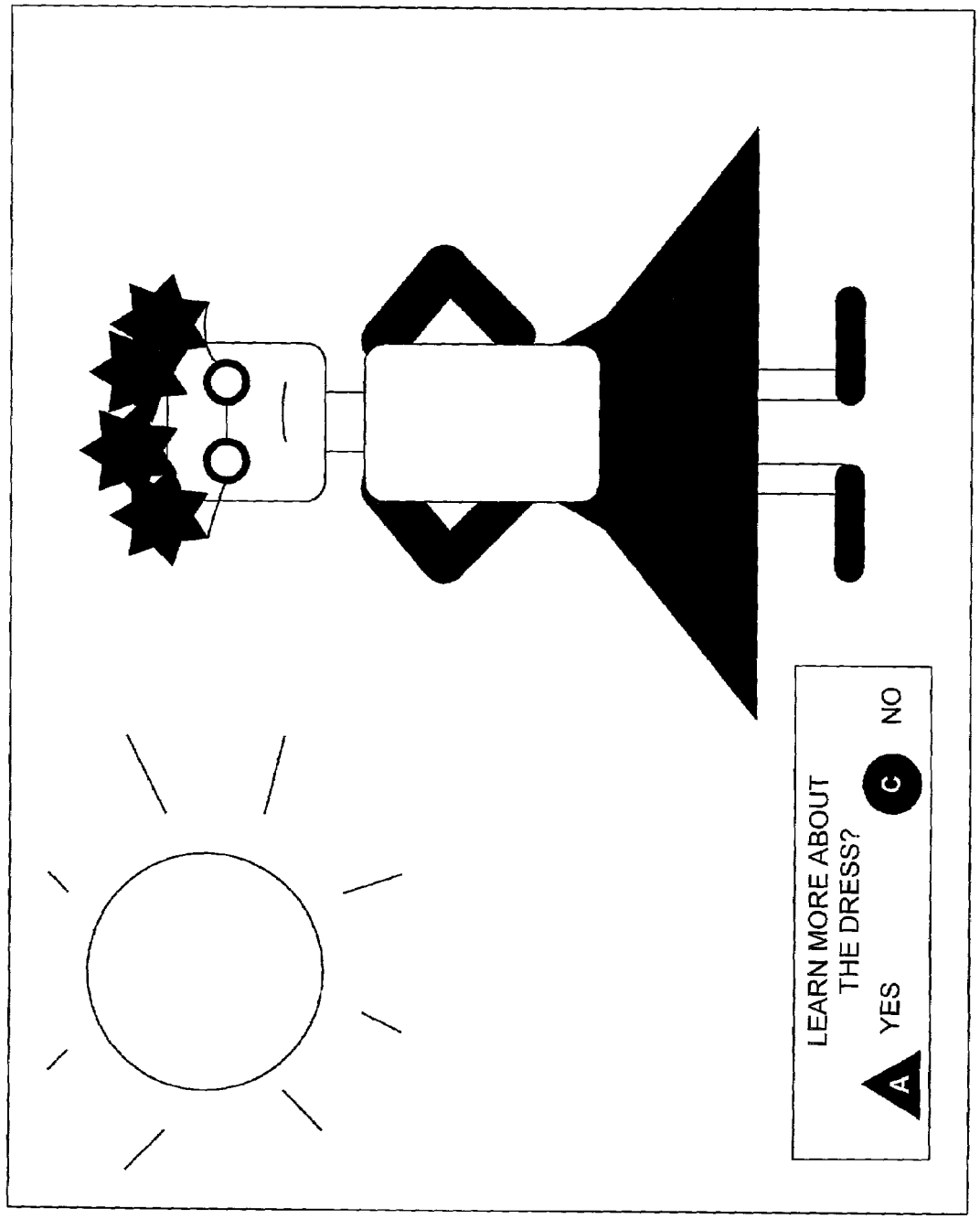
FIG. 8 is a screen diagram of an example broadcast program with a hyper-linked media object, in accordance with one embodiment of the invention.

The links are in the program as private data in, preferably, an MPEG transport stream, and interpreted by the controlling application (for example, the WatchTV application 362). The links can be displayed at the bottom of a screen display or as a "pop-up" on the screen display. Alternatively, nothing would be displayed, and the user would simply use an input device to "click" on an object in the program displayed on the screen such that the user is provided with interactive feedback of whether a link is available for that object (e.g. the media object would come up, or a "pop-up" would come up). The type of information that can be presented includes, as a few examples among many, presenting the user an option of buying the car displayed in a program, or learning more about the car or other items in the displayed program such as purchasing a dress, as illustrated in FIG. 8. Or the user can simply be presented with a brief description and/or price of the car. In other embodiments, the user may be presented with an Uniform Resource Locator (URL) for more Internet information, such as for e-commerce.

As described with the previous implementations, the DMFSML hardware status check API 901 can be invoked when the user tunes to a channel to watch a program or movie (for example, via the WatchTV application 362). Again assuming a first-time start-up, after confirming local storage is present (e.g. storage device 373), the application can request, via a GUI, whether the user desires enhanced services. If the user decides to have enhanced services, the DSFML open file API 902 can be invoked, causing the read and write of hyper-linked media objects from a second file system (i.e. virtual file system), to a first file system (i.e. local storage device 373) via the DMFSML read and write API (903 and 904, respectively).

Once provisioned for enhanced viewing, the DHCT 14 can receive the hyper-linked media objects through the controlling application (e.g. WatchTV application). The length of time transmitted ahead of the program's start time is referred to as the delta-time window. Alternatively, hyper-linked media objects can be downloaded ahead of time at a designated time on a daily basis (e.g., after midnight), weekly basis, or periodically at finite intervals of times such as 12-hour periods. One of many advantages of transmitting hyper-linked media objects continuously ahead of the program's start-time for which they are associated with over their transmission on a periodic pre-determined schedule is that less storage capacity is consumed. The storage device 373 (herein it will be understood that other internal or external storage devices in addition to storage device 373 of the DHCT 14 are within the scope of the preferred embodiments) retains media content only for the about-to-be-shown programs and currently-showing programs. Media objects for past programs become obsolete and their storage capacity can be reassigned for media objects of the next set of forthcoming programs to be shown. Furthermore, even during the course of time that a program is showing, the storage space consumed by media objects that are associated with past intervals of the program can be relinquished and reassigned.

As hyper-linked media content is transmitted and received in the DHCT 14 (e.g., 10 minutes ahead of time), the respective data received via the DHCT DBDS interface 342 is written to memory 112 and transferred to the local physical storage device 373. When a broadcast program starts, hyper-linked media objects corresponding to the program are accessible from the storage device 373 by association indices with respective time references. Hyper-linked media objects associated with a program are preferably stored as individual files under one common directory in the storage device 373. The application (e.g. WatchTV) that receives and accesses these media objects constructs this directory. The directory is created via file allocation and write operations. However, readily accessible information for the application (i.e. information that contains the directory and subdirectory structure) will be in a file in the hard drive of the storage device 373 or non-volatile memory. A copy, or parts thereof, may reside in system memory 112 for fast access and real-time presentation (thus eliminating or reducing the latency of hyper-linked information or data.

In one embodiment, the hyper-linked media objects are organized in a sub-directory structure and nomenclature that permits effective access to the hyper-linked media objects during a program's show-time and facile rapid deletion of obsolete files. Such directory is named according to a nomenclature that organizes subdirectories by channels and by start-time relative to the current time. The hyper-linked media objects are initially created via an authoring tool by the Content Provider 18 (FIG. 1), and organized by service (e.g. WatchTV service such as HBO). A channel line-up can be different on different hubs of the network 38 (FIG. 1), or even personalized by subscriber, while the service line-up is constant. For example, the WatchTV service HBO may be on channel 15 in one DHCT 14 and channel 200 on another DHCT. Thus, all directories organized by channel need to correspond to services, which each have typically a 3-5 letter short description that is unique and can be used to identify the service. In one implementation, the hyper-linked media objects are received by the SAM server 225 (FIG. 3A) and forwarded to the SAM client 357 (FIG. 4), where a service to display channel translation is rendered. In other embodiments, this translation can occur at the SAM server 225. In another embodiment, this translation can occur in both the SAM server 225 and the SAM client 357. Because of the desire, in one implementation, to re-use sub-directory structures, it is advantageous not to have to rename the subdirectories. Therefore to retain the concept of time even as time progresses, the concept of relative time to the actual current time, rather than absolute time, is employed in the sub-directory nomenclature.

Figure 9:
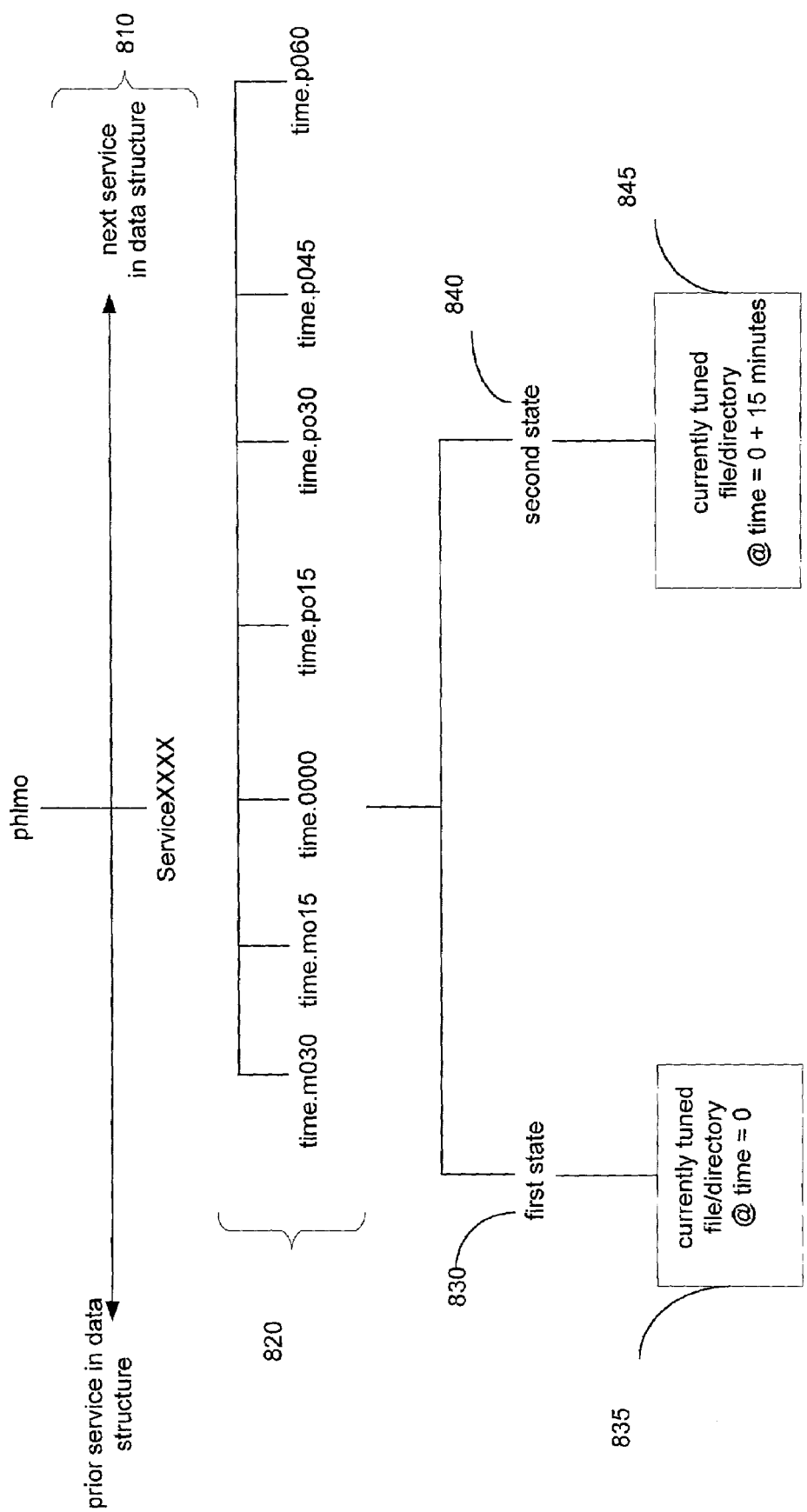
FIG. 9 is a block diagram of an example directory data structure for accessing hyper-linked media objects from a storage device coupled to the DHCT of FIG. 4, in accordance with one embodiment of the invention.

The DHCT storage device 373 is assigned a single parent directory to store all hyper-linked media objects, as illustrated in the block diagram of the example data structure of FIG. 9. This directory is named appropriately, for instance, "program media objects" or "phlmo" (for program hype-linked media objects). Under the parent directory, each service in the TV channel line-up has a respective directory 810 named by the service short description in the SAM, e.g. WNBC or HBO. The service directory 810 indicated in FIG. 9 includes Service XXXX, with the understanding that services exist before and after XXXX with a comparable data structure. Alternatively, each service can be assigned a parent directory such as phlmo.XXXX. Under a service's respective directory exist multiple sub-directories 820, each respectively named to a time increment relative to the current corresponding time. For example, when a fifteen-minute increment is the time granularity employed to organize access to hyper-linked media objects and the delta-time window is an hour, the subdirectories 820 under a service directory can be time.0000, time.m015, time.m030, time.p015, time.p030, time.p045, and time.p060. Herein, a fifteen-minute increment of time is used for exemplary purposes but a finer or coarser increment of time can be employed. The subdirectory time.0000 serves as the sub-directory to find all hyper-linked media objects effective for the current fifteen-minute increment of time. Hence, during the current fifteen-minute increment of time, a software application (such as WatchTV 362) can access the content of this subdirectory to find the hyper-linked media objects that are effective with the program being shown by the service provided on the respective channel shown on the TV display. Sub-directory time.m015 contains access to all the hyper-linked media objects that were effective in the prior fifteen-minute increment of time and time.p015 contains access to all the hyper-linked media objects that will be effective in the next fifteen-minute increment of time. Likewise, the other subdirectories 820 reflect a name for a respective fifteen-minute increment in relation to the current time. Because the delta-time window in this example is 60 minutes, during the current fifteen-minute increment of time, information destined to be effective 60 minutes from the current time is received from the cable TV network via DHCT in-band tuner 345 (FIG. 4) or downstream out-of-band channel interface 108 (FIG. 4), buffered in memory 112, and transferred to DHCT storage device 373 (FIG. 4). In particular, information is deposited to and organized within subdirectory time.p060 during the current fifteen-minute time increment.

A hyper-linked media object can be effective for one or more consecutive next fifteen-minute increments of time. It can also be effective during non-consecutive fifteen-minute time increments.

A software application, such as the WatchTV application 362, keeps track of one of two states within the current fifteen-minute time increment (i.e, time.0000 sub-directory). A first-state named file 830 within the current fifteen-minute time increment contains in its contents the name (in ASCII or Unicode format) of the file or directory 835 in the local physical storage device (for example, storage device 373) in which to find the hyper-linked media objects associated with the program showing in the currently tuned TV service that are effective during the current fifteen-minute increment of time. Hence, the content of this file serves as an indirection in where to access the media objects. A second-state 840 named within the current fifteen-minute time increment (i.e, time.0000 sub-directory) contains in its content the name of the file or directory 845 in the local physical storage device in which to find the hyper-linked media objects associated with the program showing in the currently tuned TV service for the subsequent fifteen-minute time increment. This second-state named file 845 must be re-written with new content prior to the expiration of the current fifteen-minute time increment. The software application knows to access the alternate state file from one fifteen-minute time increment to the next and thus ping-pongs between them as time progresses. Future time increments, such as sub-directories time.m015, time.m030, time.p015, time.p030, time.p045, and time.p060, only contain a single state named file and thus do not require dual state-named files.

The content of the accessed state file yields a file (or directory) (835 and 845) in which to find a table with entries (not shown) that are effective for a fifteen-minute increment of time. The table contains a header with multiple data fields. A first data field, for instance fixed-length field such as byte field, in the header contains table status. A reserved value, such as "00" hexadecimal, denotes that the table is associated with a service that does not contain hyper-linked media objects. A second fixed-length field in the header of the table represents the number of entries. The table's header concludes with a list of fixed-length data fields, each the number of bytes (or addresses in memory) for which to offset from the beginning of the table to obtain the respective entry in the table. Each table entry contains multiple data fields. A first data field is a fixed-length field, such as a single byte, indicating status of the media object associated with this entry. A reserved value, such as "00" hexadecimal for this byte field denotes that the media object associated with this entry will no longer be used in future fifteen-minute increments of time and thus its storage capacity can be designated for re-assignment (or to be written over). Another reserved value such as "FF" hexadecimal denotes that the media object associated with this entry will be used in future fifteen-minute increments of time and thus must not be written over in storage. A second data fixed-length field is used to indicate the type of media object associated with this entry. A third data field of variable length, and hence the requirement for offsets to the beginning of each entry in the table's header, contains the sub-directory path and file name in which the actual hyper-linked media object is found in the storage device.

Because the content of this table is merely text data and small, it can be transferred to memory 112 (FIG. 4) for more efficient access by the software application program during the program showing. The table is transferred to memory 112 prior to the effective fifteen-minute time increment of time. In one embodiment of the invention, in anticipation of channel changes, the table for each respective channel in the channel line-up is kept in memory 112. Some channels may not contain hyper-linked media objects in which case the table header indicates so. In another embodiment of the invention, multiple sets of tables, each set corresponding to a subsequently contiguous fifteen-minute increments of time, and each table corresponding to its respective channel in the channel line-up, is also kept in memory 112 during the current fifteen-minute increment of time.

The storage device information is updated as time progresses to advance information to their respective time increment sub-directory. Advantageously, a small number of "file copy" operations are performed within the current fifteen-minute time increment to prepare for the next fifteen-minute time increment. The single-state-named file of the subsequent fifteen-minute time increment (i.e., the file in subdirectory time.p015) is copied to the alternate-state named file of the current fifteen minute increment (i.e., sub-directory time.0000). Likewise, the single-state-named file of each future fifteen-minute time increment is copied to the single-state-named file of its immediately preceding fifteen minute increment (e.g., from subdirectory time.p045 to subdirectory time.p030). When a copy of the tables corresponding to future fifteen-minute increments of times are kept in memory 112, the content of the subdirectories can be refreshed at granularities longer than fifteen-minutes but less than the delta-time window.

An additional separate file (not shown) contains a set of tables with indices to the individual media objects in the directory. The nomenclature of such indices is such that the software application running on the DHCT 14 knows how to interpret them (i.e. the indices) and the indices can be accessed by the software application running on the DHCT 14. As a broadcast program progresses in time, part of the hyper-linked media in the storage device (such as storage device 373) becomes obsolete and can be written over with new hyper-linked media associated with a future time of the broadcast program. Hence, hyper-linked media is continually transmitted or transmitted during sequential intervals of time and then received by the DHCT 14 and transferred to the storage device 373. Thus, the hyper-linked media in the storage device 373 is replenished during the course of time.

Therefore, it should be appreciated that multiple video objects, some from television services and others read as video objects stored in a local storage device 373 may be simultaneously viewed using the DHCT 14 in accordance with one embodiment of the invention, which includes the use of one or more tuners and one or more local storage devices 373 connected to DHCT 14. Furthermore, it should be appreciated that additional content, such as graphical, audio and textual objects, can likewise be received by one or more of tuners or read from the local storage device 373 and presented simultaneously on the display to be viewed by a subscriber at the same time the subscriber is viewing the multiple video objects.

Although the preferred embodiments are discussed in relation to subscriber network television systems with many and varied services, other systems with a limited variety and/or quantity of services are also included within the scope of the preferred embodiments of the invention.

The DMFSML 900, along with the DMFSML hardware status check API 901, the DMFSML open file API 902, the DMFSML read file API 903, and the DMFSML write file API 904, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, among others, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A digital home communication terminal (DHCT) comprising:
    a memory that stores executable instruction sequences; and
    a processor that executes the stored executable instruction sequences, the stored executable instruction sequences including:
        an electronic programming guide (EPG) application that provides user access to EPG information, the EPG application configured to generate for display an EPG comprising a grid of broadcast media content instance titles and a scheduled broadcast start time for each of the media content instance titles, the EPG application further configured to provide a base service comprising the media content instance titles corresponding to a first period and each respective scheduled broadcast start time, the EPG application further configured to provide an extended service that provides additional information in the EPG, the extended service dormant until activated in direct response to detection of a connected local storage device, the EPG information comprising the base service and the extended service;
        a dual mode file system that provides a common interface to both the local storage device and a remotely located storage device;
    wherein the EPG application further includes:
        instructions that are capable of determining whether a local storage device is physically connected and not physically connected to the DHCT;
        instructions that use the dual mode file system to retrieve the EPG information from the remotely located storage device in cooperation with a carousel-type server and store the EPG information in the memory, responsive to determining that the local storage device is not physically connected to the DHCT; and
        instructions that use the dual mode file system to retrieve the EPG information from the remotely located storage device in cooperation with the carousel-type server and store the EPG information in the local storage device, responsive to determining that the local storage device is physically connected to the DHCT.

2. The DHCT of claim 1, wherein the processor is further configured with the instructions that are capable of determining to detect when the local storage device is operable.

3. The DHCT of claim 1, wherein the processor is further configured with the instructions that are capable of determining to detect when the local storage device is inoperable.

4. The DHCT of claim 1, wherein the processor is further configured with the instructions that are capable of determining to provide feedback to a user when the local storage device is available.

5. The DHCT of claim 1, wherein the executable instruction sequences is configured to cause playback of the remote data from the memory to a screen display.

6. The DHCT of claim 1, wherein the processor is further configured with the executable instruction sequences to substantially simultaneously transfer the stored EPG information to the local storage device while receiving additional remote data EPG information from the remotely located storage device to the memory.

7. The DHCT of claim 1, wherein the executable instruction sequences is configured to support the processor with the EPG information from the local storage device by receiving the EPG information into the memory, wherein the executable instruction sequences is further configured to cause playback from the memory to a screen display.

8. The DHCT of claim 1, wherein the executable instruction sequences is configured to support the processor with the EPG information from the local storage device by streaming the EPG information from the local storage device to a display device.

9. The DHCT of claim 1, wherein the processor is further configured with the executable instruction sequences to receive the remote EPG information through an out-of band channel.

10. The DHCT of claim 1, wherein the processor is further configured with the executable instruction sequences to store in the local storage device data associated with a future media content instance, wherein said data is received into the local storage device in advance of the presentation of said future media content instance.

11. The DHCT of claim 1, wherein the processor is further configured with the executable instruction sequences to receive the remote EPG information from the remotely located storage device to the local storage device while substantially simultaneously uploading the local EPG information from the local storage device.

12. The DHCT of claim 1, wherein the processor is further configured with the executable instruction sequences to perform multiple read operations and multiple write operations in parallel to accessing a plurality of data in the local storage device.

13. The DHCT of claim 12, wherein the multiple read operations and the multiple write operations occur substantially concurrently within substantially the same window of time.

14. The DHCT of claim 12, wherein the multiple read operations and the multiple write operations share slices of a window of time as if occurring substantially in parallel.

15. The DHCT of claim 1, wherein a media of the local storage device is partitioned into plural media partitions, including a media content portion for streaming media content for presentation to a user.

16. The DHCT of claim 15, wherein the media partitions are user configurable.

17. The DHCT of claim 1, further comprising two tuners for receiving the remote EPG information among a plurality of transmission channels, further comprising an out of band channel for receiving and sending data, further comprising a communication port.

18. The DHCT of claim 17, wherein the plurality of the transmission channels includes at least one digital transmission channel and at least one analog transmission channel.

19. The DHCT of claim 17, wherein the processor is further configured with the executable instruction sequences to request a plurality of data simultaneously from the plurality of the transmission channels.

20. The DHCT of claim 17, wherein the memory and the local storage device store application data, application executable programs, and data associated with applications, and data associated with media services.

21. The DHCT of claim 17, wherein the processor is further configured with the executable instruction sequences to perform a multiplicity of write operations to the local storage device substantially in parallel to storing the local and remote EPG information and application clients from a subscriber television network, from the processor, and from a local device connected to the communication port.

22. The DHCT of claim 17, wherein the processor is further configured with the executable instruction sequences to perform a multiplicity of read operations from the local storage device in parallel to retrieving the local EPG information and application clients previously stored in the local storage device to transmit the respective local EPG information and application clients to a local device connected to the communication port, to the memory for use by an application client or operating system executing in the processor, and to be transmitted to a destination in the subscriber network.

23. The DHCT of claim 17, wherein the processor is further configured with the executable instruction sequences to substantially simultaneously permanently record a media content instance received from one transmission channel and temporarily store a second media content instance received from another transmission channel.

24. The DHCT of claim 17, wherein the processor is further configured with the executable instruction sequences to permanently record two media content instances substantially simultaneously from two different transmission channels.

25. The DHCT of claim 17, wherein the processor is further configured with the executable instruction sequences to substantially simultaneously display three media content instances, wherein the two media content instances are received from the transmission channels and the third media content instance is received from the local storage device.

26. The DHCT of claim 17, wherein media content instances from the transmission channels are received in real-time.

27. The DHCT of claim 1, further comprising an application client, wherein the processor is further configured with the executable instruction sequences to use the memory and the local storage device for storing application client data in data structures with time-sensitive data entries maintained by an application client daemon task.

28. The DHCT of claim 27, wherein the processor is further configured with the executable instruction sequences to receive the application client data from an in-band tuner.

29. The DHCT of claim 27, wherein the processor is further configured with the executable instruction sequences to receive the application client data from a plurality of in-band tuners.

30. The DHCT of claim 1, wherein the processor is further configured to receive the retrieved electronic programming guide information entirely into the memory rather than into the local storage device, wherein the processor is further configured to access the electronic programming guide information in memory for presentation in a display device.

31. The DHCT of claim 1, wherein the processor is further configured to store the retrieved electronic programming guide information entirely into the local storage device, wherein processor is further configured to access the stored electronic programming guide information for presentation in a display device.

32. The DHCT of claim 1, wherein the processor is further configured with the executable instruction sequences to receive a list of media content instances for an extended amount of days and the corresponding standard description information into the local storage device.

33. The DHCT of claim 1, wherein the processor is further configured with the executable instruction sequences to receive a list of media content instances for an extended amount of days and a corresponding long description information collectively corresponding to the extended service into the local storage device.

34. The DHCT of claim 33, wherein the processor is further configured with the executable instruction sequences to receive the long description information into the local storage device for the list of media content instances for the standard amount of days stored in the memory.

35. The DHCT of claim 33, wherein the processor is further configured with the executable instruction sequences to receive media content instance preview audio and data clips associated with a media content instance in the list of media content instances for the standard amount of days and store said media content instance preview audio and data clips into the memory.

36. The DHCT of claim 35, wherein the processor is further configured with the executable instruction sequences to transfer said media content instance preview audio and data clips from the memory to the local storage device, wherein the processor is further configured with the executable instruction sequences to access said media content instance preview audio and data clips from the local storage device to the memory, wherein the processor is further configured with the executable instruction sequences to present said media content preview audio and data clips on a display device from the memory.

37. The DHCT of claim 35, wherein the processor is further configured with the executable instruction sequences to transfer said media content instance preview audio and data clips from the memory to the local storage device, wherein the processor is further configured with the executable instruction sequences to access said media content instance preview audio and data clips from the local storage device and present said media content instance preview audio and data clips on a display device from the local storage device.

38. The DHCT of claim 1, wherein the processor is further configured with the executable instruction sequences to access sprites from the remotely located storage device and store in the local storage device to augment the presentation of media content instances when retrieved from the local storage device from an application client.

39. The DHCT of claim 1, wherein the processor is further configured with the executable instruction sequences to retrieve hyper-linked data corresponding to a media content instance before the presentation of said media content instance.

40. The DHCT of claim 1, wherein the processor is further configured with the executable instruction sequences to maintain hyper-linked data in entries in a hyper-linked data structure indexed by time and date and service.

41. The DHCT of claim 1, wherein the processor is further configured with the executable instruction sequences to maintain hyper-linked data in entries in a hyper-linked data structure indexed by time and date and channel.

42. The DHCT of claim 41, wherein the hyper-linked data structure provides a channel directory and subdirectories segregated into time blocks corresponding to a media content instance time period of presentation, wherein the time blocks include a current time block and an upcoming time block.

43. The DHCT of claim 42, wherein the current time block and upcoming time block are further segregated into time slots of increased granularity corresponding to a timed presentation of the hyper-linked data with a corresponding instance in a media content instance within said time blocks.

44. The DHCT of claim 43, wherein the hyper-linked data structure is updated continuously to maintain the hyper-linked data for current and upcoming media content instances.

45. The DHCT of claim 44, wherein the processor is further configured with the executable instruction sequences to update the hyper-linked data when the time and date has substantially elapsed.

46. The DHCT of claim 45, wherein processor is further configured with the executable instruction sequences to use the local storage device for caching hyper-linked data into the local storage device from the remotely located storage device, wherein the hyper-linked data corresponds to data located in a designated time slot of a presentation of a media content instance, wherein an application client is further configured to retrieve the hyper-linked data from the local storage device and present it during its designated time slot during the presentation of the media content instance.

47. The DHCT of claim 1, wherein the EPG application is configured to transfer a portion of the EPG information corresponding to the extended service for a second period of time to the memory upon a lapse of time corresponding to the first period of time that coincides with the media content instance titles corresponding to the base service, the second period of time not overlapping the first period of time and immediately following the first period of time.

48. A method in a digital home communication terminal (DHCT) comprising the steps of:
  determining whether a local storage device is physically connected and not physically connected to the DHCT;
  responsive to determining that the local storage device is not physically connected to the DHCT, retrieving from a remote storage device in cooperation with a carousel-type server a base service EPG information and storing base service EPG information in a memory residing in the DHCT, the base service EPG information comprising media content instance titles and a scheduled broadcast start time for each of the media content instance titles;
  responsive to determining that the local storage device is physically connected to the DHCT, activating a previously dormant portion of an EPG application that provides an extended service, retrieving from the remote storage device in cooperation with the carousel-type server the base service EPG information and an extended service EPG information, and storing the extended service EPG information in the local storage device and the base service EPG information in the memory, the extended service EPG information comprising information supplemental to the base service EPG information yet unavailable for extended local storage prior to the activation; and
  presenting the base service and extended service EPG information to a display device responsive to a user request, the extended service EPG information provided from the remote storage device proximal in time to the user request if the local storage is not connected, otherwise the extended service EPG information is provided from the local storage without intervention of the remote storage device.

49. The method of claim 48, further comprising the step of receiving the base service electronic programming guide information entirely into the memory residing in the DHCT, further comprising the step of accessing the base service electronic programming guide information for presentation in the display device.

50. The method of claim 48, further comprising the step of receiving the extended service electronic programming guide information entirely into the local storage device, further comprising the step of accessing the extended service electronic programming guide information for presentation in the display device.

51. The method of claim 48, further comprising the step of receiving the long description information corresponding to the extended service EPG information into the local storage device for a list of media content instances for a standard amount of days stored in the memory.

52. The method of claim 48, further comprising the step of transferring a portion of the extended service EPG information for a second period of time to the memory upon a lapse of time corresponding to a first period of time that coincides with the media content instance titles corresponding to the base service EPG information, the second period of time not overlapping the first period of time and immediately following the first period of time.

53. A dual mode file method in a digital home communication terminal (DHCT) comprising the steps of:
  determining that a local storage device is physically connected to the DHCT;
  responsive to determining that the local storage device is physically connected to the DHCT:
  retrieving, from a remotely located carousel type server first electronic programming guide (EPG) information comprising a first base EPG service and first extended EPG service, the first base EPG service comprising media content instance titles and corresponding broadcast start times for a first period of time, the first extended EPG service comprising media content instance titles and corresponding broadcast start times for a second period of time not overlapping the first period of time;
  storing the first EPG information corresponding to the first base EPG service exclusively in a memory residing in the DHCT and initially storing for an extended period the first EPG information corresponding to the first extended EPG service exclusively in the local storage device;
  presenting, in response to a user request for the first EPG information, the first EPG information by accessing the memory and the local storage device;
  determining that the local storage device is not physically connected to the DHCT;
  responsive to determining that the local storage device is not physically connected to the local storage device:
  retrieving, from the carousel type server, second electronic programming guide (EPG) information comprising a second base EPG service comprising media content instance titles and corresponding broadcast start times corresponding to a third period of time;
  storing the second EPG information in the memory residing in the DHCT; and
  presenting the second EPG information responsive to a user request by accessing the memory for the second base EPG services and accessing, proximal in time to the user request and different in time than the retrieval and storage of the second EPG information, second extended EPG services comprising media content instance titles and corresponding broadcast start times for a fourth period of time, the fourth period of time not overlapping the third period of time.

54. The method of claim 53, further comprising the step of transferring the first EPG information corresponding to the first extended EPG service from the local storage device to the memory upon a lapse of the first period of time.

* * * * *

UNITED STATES PATENT AND TRADEMARK OFFICE
CERTIFICATE OF CORRECTION

PATENT NO. : 7,657,916 B2  Page 1 of 1
APPLICATION NO. : 09/918376
DATED : February 2, 2010
INVENTOR(S) : Rodriguez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1707 days.

Signed and Sealed this

Twenty-eighth Day of December, 2010

David J. Kappos
*Director of the United States Patent and Trademark Office*